United States Patent
Singh et al.

(10) Patent No.: US 11,216,658 B2
(45) Date of Patent: Jan. 4, 2022

(54) UTILIZING GLYPH-BASED MACHINE LEARNING MODELS TO GENERATE MATCHING FONTS

(71) Applicant: Adobe Inc., San José, CA (US)

(72) Inventors: Monica Singh, Agra (IN); Prateek Gaurav, Lucknow (IN); Amish Kumar Bedi, Naya Nangal (IN)

(73) Assignee: Adobe Inc., San Jose, CA (US)

(*) Notice: Subject to any disclaimer, the term of this patent is extended or adjusted under 35 U.S.C. 154(b) by 163 days.

(21) Appl. No.: 16/190,466

(22) Filed: Nov. 14, 2018

(65) Prior Publication Data

US 2020/0151442 A1    May 14, 2020

(51) Int. Cl.
*G06K 9/00* (2006.01)
*G06K 9/66* (2006.01)
*G06K 9/62* (2006.01)
*G06F 16/51* (2019.01)

(52) U.S. Cl.
CPC ......... *G06K 9/00442* (2013.01); *G06F 16/51* (2019.01); *G06K 9/6202* (2013.01); *G06K 9/6215* (2013.01); *G06K 9/6257* (2013.01); *G06K 9/66* (2013.01); *G06K 2209/013* (2013.01)

(58) Field of Classification Search
CPC .......... G06N 3/0454; G06N 3/08; G06N 3/00; G06K 9/6828
See application file for complete search history.

(56) References Cited

U.S. PATENT DOCUMENTS

| 5,396,588 A | * | 3/1995 | Froessl | G06K 9/6828 715/234 |
| 7,999,950 B1 | * | 8/2011 | Cohen | G06F 3/1208 358/1.11 |
| 2008/0240566 A1 | * | 10/2008 | Thint | G06K 9/627 382/181 |

(Continued)

OTHER PUBLICATIONS

Ozturk, Serdar, Bulent Sankur, and Ali Toygar Abak. "Font clustering and cluster identification in document images." Journal of Electronic Imaging 10.2 (2001): 418-430. (Year: 2001).*

(Continued)

*Primary Examiner* — Vincent Rudolph
*Assistant Examiner* — Raphael Schwartz
(74) *Attorney, Agent, or Firm* — Keller Jolley Preece

(57) ABSTRACT

The present disclosure relates to systems, methods, and non-transitory computer readable media for generating and providing matching fonts by utilizing a glyph-based machine learning model. For example, the disclosed systems can generate a glyph image by arranging glyphs from a digital document according to an ordering rule. The disclosed systems can further identify target fonts as fonts that include the glyphs within the glyph image. The disclosed systems can further generate target glyph images by arranging glyphs of the target fonts according to the ordering rule. Based on the glyph image and the target glyph images, the disclosed systems can utilize a glyph-based machine learning model to generate and compare glyph image feature vectors. By comparing a glyph image feature vector with a target glyph image feature vector, the font matching system can identify one or more matching glyphs.

20 Claims, 15 Drawing Sheets

(56) References Cited

U.S. PATENT DOCUMENTS

| | | | | |
|---|---|---|---|---|
| 2011/0276872 A1* | 11/2011 | Kataria | ................. | G06F 40/109 |
| | | | | 715/234 |
| 2015/0074522 A1* | 3/2015 | Harned, III | ........... | G06F 40/109 |
| | | | | 715/269 |
| 2016/0364633 A1* | 12/2016 | Yang | ..................... | G06N 3/0454 |
| 2017/0098140 A1* | 4/2017 | Wang | ........................ | G06T 3/40 |
| 2017/0262414 A1* | 9/2017 | Pao | ........................ | G06F 40/109 |

OTHER PUBLICATIONS

Solli, Martin. Topics in Content Based Image Retrieval: Fonts and Color Emotions. Diss. Linköping University Electronic Press, 2009. (Year: 2009).*

* cited by examiner

UTILIZING GLYPH-BASED MACHINE LEARNING MODELS TO GENERATE MATCHING FONTS

BACKGROUND

Advancements in software and hardware platforms have provided a variety of improvements in systems that enable digital content creators to generate and edit digital content. For example, digital content editing systems are now able to provide tools for creating digital documents that include digital text in a variety of fonts, styles, and formats. Amid efforts to improve these digital content editing systems, some systems can, for example, provide tools to find multiple fonts having similar styles.

Despite these advances however, conventional digital content editing systems continue to suffer from a number of disadvantages, particularly in their accuracy, efficiency, and flexibility. For example, although many conventional digital content editing systems can identify a font with similar characteristics to another font, these systems nevertheless fail to account for different languages, glyph variations, font locales, and open type font attributes. Indeed, many of these systems are tailored to specific languages or character types (e.g., Latin characters) and are therefore incapable of analyzing languages with other character types (e.g., non-Latin-based fonts). In addition, many of these systems suggest fonts for utilization in a digital document, even though the suggested font is missing glyphs and/or attributes needed for the digital document. As a result, these systems often inaccurately identify fonts to recommend or apply within a digital document, which can result in incomprehensible and/or incomplete text.

Moreover, the inaccuracy of conventional systems also leads to significant inefficiencies. For example, in order to identify similar fonts across fonts for different languages (e.g., non-Latin characters fonts), conventional systems require a significant amount of time, computer resources, and user interactions. For instance, to identify similar Japanese fonts users of conventional systems scroll through lists of digital fonts and test the digital fonts within a digital document to determine whether the tested fonts will function properly. This approach leads to unnecessary selections, redundant application of a variety of different digital fonts, wasted computer resources, and excessive time.

In addition, some conventional digital content editing systems are inflexible. For example, some systems analyze a standard string of glyphs as a basis for identifying similar fonts. To illustrate, conventional systems are often limited to a string of characters from a specific language or character set. Indeed, many systems can only identify fonts that use Latin characters by analyzing a standard string of glyphs such as "ABC . . . XYZabc . . . xyz." By limiting the glyph analysis in this way, these systems cannot flexibly adapt to the use of fonts in different languages and/or fonts that include different character or glyph sets.

Thus, there are several disadvantages with regard to conventional digital content editing systems.

SUMMARY

One or more embodiments described herein provide benefits and solve one or more of the foregoing or other problems in the art with systems, methods, and non-transitory computer readable media that generate matching fonts by utilizing glyph-based machine learning models. In particular, the disclosed systems can identify glyphs associated with a digital document and utilize a deep learning model to generate a font that matches the identified glyphs. Specifically, the disclosed systems can train a glyph-based machine learning model (e.g., tune the model based on individual training glyphs) and then utilize the model to generate and compare feature vectors associated with the identified glyphs and various target fonts. For example, the disclosed systems can utilize a trained glyph-based deep learning model to generate a feature vector for a glyph image reflecting the identified glyphs and can utilize the deep learning model to generate feature vectors for target glyph images corresponding to a plurality of target fonts. To identify a matching font, the disclosed systems can then utilize the glyph-based deep learning model to compare the feature vector of the identified glyphs with the feature vectors of the target fonts. By utilizing a glyph-based machine learning model in this manner, the disclosed systems can accurately, efficiently, and flexibly determine matching fonts across various languages, font locales, and glyph types.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
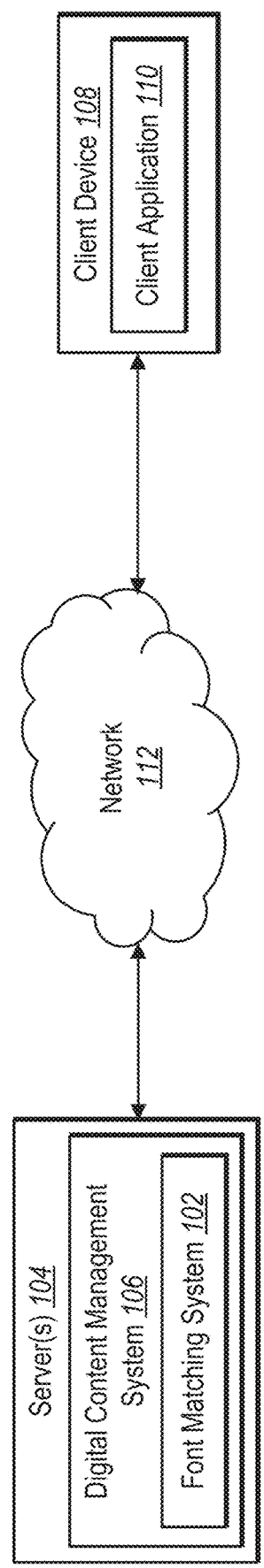
FIG. 1 illustrates an example environment for implementing a font matching system in accordance with one or more embodiments.

One or more embodiments described herein provide benefits and solve one or more of the foregoing or other problems in the art with a font matching system that utilizes a glyph-based machine learning model to generate, provide, and apply matching fonts. For example, the font matching system can identify glyphs from selected content in a digital document and find matching fonts by analyzing the unique glyphs in the selected content against target fonts that have the same set of glyphs. In particular, the font matching system can apply a glyph-based machine learning model and dynamically generate feature vectors for selected text and target fonts to identify matching fonts. The font matching system can generate these feature vectors in real time (e.g., on-the-go) in response to user selected text (or other user interactions). The font matching system can further apply the glyph-based machine learning model to compare feature vectors of the target fonts with the feature vector of the selected text and identify a matching font. Because the font matching system can utilize a glyph-based machine learning model trained on a variety of different glyphs (e.g., for various languages), the font matching system can find matching fonts for a wide array of different languages, fonts, or selected texts.

As mentioned above, the font matching system can generate a matching font for one or more identified glyphs. More particularly, the font matching system can identify glyphs from a portion of digital text and/or from a font utilized in a digital document. The font matching system can generate a glyph image by arranging the identified glyphs according to an ordering rule (e.g., in ASCII value order). In addition, the font matching system can generate target glyph images from a plurality of target fonts by arranging glyphs from the plurality of target fonts according to the ordering rule. Further, the font matching system can provide the glyph image and the target glyph images to a glyph-based machine learning model to identify a matching font form the plurality of target fonts that correspond to the identified glyphs (e.g., from the portion of digital text or as utilized in the digital document).

As just mentioned, to generate a matching font the font matching system can identify one or more glyphs. For example, the font matching system can identify glyphs from a font utilized within a digital document. To illustrate, the font matching system can receive a user selection of a portion of digital text and can identify glyphs (e.g., unique glyphs) within the selection. Similarly, the font matching system can identify glyphs within a font selected by a user for a digital document.

Based on the identified glyphs, the font matching system can generate a glyph image. To illustrate, the font matching system can identify unique glyphs (e.g., by filtering out repeat glyphs) within a font or a selection of digital text and can arrange the unique glyphs according to an ordering rule. For example, the font matching system can arrange the unique glyphs according to their respective standardized encoding values such as ASCII values, Unicode values, or some other font encoding value. Moreover, the font matching system can transform the ordered glyphs into a digital image. Thus, the font matching system can generate a glyph image of contiguously ordered, arranged glyphs of the font from the digital document.

Additionally, the font matching system can generate a glyph image feature vector based on the generated glyph image. To elaborate, the font matching system can input the glyph image into a trained glyph-based machine learning model (e.g., an image classification/comparison neural network tuned on individual glyphs). By utilizing the glyph-based machine learning model, the font matching system can generate glyph feature vectors—e.g., by generating individual feature vectors for each identified unique glyph within the glyph image. The font matching system can further concatenate the individual glyph feature vectors together according to the ordering rule to generate a glyph image feature vector that describes the glyph image as a whole.

As mentioned, the font matching system can further identify target fonts that include the identified glyphs. In particular, the font matching system can reduce a pool of potential matching fonts (e.g., all fonts stored within a font database) to a set of target fonts that include each of the glyphs identified from the digital document (e.g., the unique glyphs within the selection). For example, the font matching system can filter out those fonts that are missing or do not include one or more of the identified glyphs. Thus, the font matching system can generate a set of target fonts that include each of the glyphs identified from the digital document.

Based on the target fonts, the font matching system can further generate target glyph images. As described above, the font matching system can generate a target glyph image for each target font within the set of target fonts. To illustrate, the font matching system can identify, within each target font, glyphs that correspond to the glyphs identified from the digital document. The font matching system can further arrange the corresponding glyphs according to the ordering rule and transform the glyphs to a digital image.

Additionally, the font matching system can generate a target glyph image feature vector for each of the target glyph images. More particularly, the font matching system can provide the target glyph images to the glyph-based machine learning model. The font matching system can utilize the glyph-based machine learning model to generate, on a glyph level, individual target glyph feature vectors for each glyph within the target glyph images. In addition, the font matching system can concatenate the target glyph feature vectors together according to the ordering rule (as mentioned above). Thus, by utilizing the glyph-based machine learning model and by concatenating target glyph feature vectors, the font matching system can generate target glyph image feature vectors to use in comparing against the glyph image feature vector of the original glyphs identified from the digital document.

Indeed, the font matching system can compare the target glyph image feature vectors of the target fonts with the glyph image feature vector of the original glyphs identified from the digital document. To illustrate, the font matching system can utilize the glyph-based machine learning model to determine, for each target font, a probability that the target glyph image feature vector of the target font matches (e.g., is visually similar to) the glyph image feature vector of the originally utilized font. Additionally, in some embodiments the font matching system can identify a matching font based on the target glyph image feature vector that has the highest probability (e.g., similarity score).

In addition, the font matching system can also train the glyph-based machine learning model. To illustrate, the font matching system can train the glyph-based machine learning model on a glyph level (e.g., based on individual training glyphs). For example, the font matching system can input a training glyph into the glyph-based machine learning model to generate a predicted matching glyph. The font matching system can further compare the predicted matching glyph with a ground truth matching glyph to determine a measure of loss (e.g., error). The font matching system can also reduce the measure of loss by modifying parameters of one or more layers within the glyph-based machine learning model to improve the accuracy of predicted matching glyphs.

The font matching system provides several advantages over conventional systems. For example, the font matching system can improve accuracy of computing systems for generating and providing matching fonts in digital documents. To illustrate, the font matching system can train and utilize a glyph-based machine learning model to dynamically generate glyph feature vectors on a glyph level. As mentioned above, this glyph-based approach can allow the font matching system to accurately identify matching fonts with respect to different languages, glyph variations, font locales, or open type font attributes. Moreover, the font matching system can generate matching fonts on more granular, detailed level than many conventional systems and avoid candidate matches that lack significant glyphs. Along similar lines, the font matching system can generate matching fonts on the fly based on user-selected text (e.g., without requiring further prompts or information).

In addition, the font matching system improves efficiency relative to conventional systems. Indeed, by generating more accurate matching fonts, the font matching system can reduce the number of user interactions, the amount of time, and computer resources utilized in identifying matching matchings and generating/modifying a digital document. For example, the font matching system can suggest one or more matching fonts that correspond to glyphs or fonts already used in the digital document. Accordingly, the font matching system can reduce (or eliminate) suggested fonts that will not operate properly in the digital document (e.g., as a result of missing glyphs). Furthermore, the font matching system can reduce the time utilized to identify matching fonts, reduce the number of user interactions, and reduce unnecessary application of inaccurate fonts within digital documents.

The font matching system also improves flexibility over conventional systems. For example, because the font matching system generates glyph images and implements a glyph-based machine learning model, the font matching system is not constrained to particular languages or strings of characters to use as a basis for identifying matching fonts. As a result, the font matching system can match fonts of Latin and non-Latin characters alike, thereby increasing flexibility over conventional systems that are incapable of considering various contexts, such as multiple font locales, languages, or character sets.

As illustrated by the foregoing discussion, the present disclosure utilizes a variety of terms to describe features and benefits of the font matching system. Additional detail is hereafter provided regarding the meaning of these terms as used in this disclosure. In particular, the term "matching" (or its alternative forms such as "match" or "matches") refers to a modifier or descriptor of a digital object that resembles or corresponds to another digital object. For example, a matching font can refer to a font that matches, resembles, complements, is similar to (e.g., most similar to), is within a threshold similarity of, or has a similar visual appearance to another font.

Similarly, the term "glyph-based machine learning model" as used herein refers to a trainable computer-based algorithm or rule set that analyzes glyphs (e.g., glyph images) to make predictions (e.g., a tunable model that is trained to make predictions based on training data). In particular, a glyph-based machine learning model includes a computer-implemented algorithm that analyzes training glyphs (e.g., training glyph images) to make predictions and that improves in accuracy by comparing generated predictions against ground truth data and modifying internal parameters for subsequent predictions. In some embodiments, a machine learning model can employ supervised learning, while in other embodiments a machine learning model can employ unsupervised learning or reinforced learning. In one or more embodiments, the machine learning model is a neural network (e.g., deep neural networks such as convolutional neural networks). A specific example neural network includes the VGG-90 neural network.

Relatedly, the term "train" refers to utilizing information to tune or teach a machine learning model such as a neural network. The term "training" (used as an adjective or descriptor, such as "training glyph") refers to information or data utilized to tune or teach the model.

As noted above, the font matching system can train a glyph-based machine learning model to generate matching glyphs based on input glyphs. As used herein, the term "glyph" refers to a symbol or pictograph of a letter or character within a font. For example, a glyph can refer to the particular pictograph/shape of the letter "A" in a particular font. Similarly, a glyph can refer to a pictograph of a character in another, non-Latin language/font such as Hindi, Russian, Telugu, Japanese, Khmer, etc.

As mentioned, the font matching system arranges glyphs of a font according to an ordering rule to generate a glyph image. As used in this disclosure, a "glyph image" refers to a visual representation of one or more glyphs. For example, a glyph image can refer to a digital image of multiple glyphs arranged together according to an ordering rule. To illustrate, a glyph image can include digital files encoding a visual representation of glyphs with the following file extensions: JPG, TIFF, BMP, PNG, RAW, or PDF. The font matching system can combine multiple glyphs into a glyph image which the font matching system can treat as a single entity or file for digital image recognition/matching.

Additionally, the term "ordering rule" refers to a rule or metric for arranging glyphs in a sequence. For example, an ordering rule can refer to a rule for arranging glyphs in a sequence according to a standardized encoding value such as ASCII values, Unicode values, or some other set of encoding values. In some embodiments, the font matching system arranges glyphs in ascending order where encoding values increase with each subsequent glyph in the arrangement. In other embodiments, the font matching system arranges glyphs in descending order where encoding values decrease with each subsequent glyph in the arrangement.

As mentioned, the font matching system can apply a glyph-based machine learning model to generate one or more feature vectors. As used herein, the term "feature vector" refers to a digital array that encodes one or more characteristics (e.g., encodes features of a glyph, glyph image, or font). The term feature vector includes latent or hidden features utilized by a neural network to generate a prediction (e.g., vectors that are not decipherable or comprehensible by humans). Additional detail regarding feature vectors that encode glyphs (e.g., "glyph feature vectors") or glyph images (e.g., "glyph image feature vectors") is provided below.

As used herein, the term "digital document" refers to electronic content that includes digital text. In particular, a digital document can include a digital file that includes a set of instructions for portraying digital text via a display of a computing device utilizing a particular font. For example, a digital document can include electronic files in the form of a word processing document, a .pdf file, an image file, an e-mail file, a text file, a web page, or any other electronic file.

In accordance with the description above, the font matching system can generate a matching font from a set of target fonts. As used herein, the term "target" can refer to a modifier or descriptor of a data object analyzed to identify a matching font (e.g., to determine whether the data object corresponds to a matching font). For example, a target font can refer to a font that is analyzed to determine if it is a matching font. In some embodiments, the font matching system identifies target fonts that include the glyphs identified from a digital document. Similarly, the font matching system can analyze a target glyph (i.e., a glyph within a target font), a target glyph feature vector (i.e., a feature vector of a glyph within a target font), a target glyph image (i.e., a visual representation of one or more glyphs of a target font arranged according to an ordering rule), and/or a target glyph image feature vector (i.e., a feature vector of a glyph image of a target font) to identify a matching font.

Additional detail regarding the font matching system will now be provided with reference to the figures. For example, FIG. 1 illustrates a schematic diagram of an example environment for implementing a font matching system 102 in accordance with one or more embodiments. An overview of the font matching system 102 is described in relation to FIG. 1. Thereafter, a more detailed description of the components and processes of the font matching system 102 is provided in relation to the subsequent figures.

As shown in FIG. 1, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 13.

As mentioned, the environment includes a client device 108. The client device 108 can be one of a variety of computing devices, including a smartphone, tablet, smart television, desktop computer, laptop computer, virtual reality device, augmented reality device, or other computing device as described in relation to FIG. 13. Although FIG. 1 illustrates a single client device 108, in some embodiments the environment can include multiple different user client devices, each associated with a different user. The client device 108 can further communicate with the server(s) 104 via the network 112. For example, the client device 108 can receive user input and other activity information and provide the information pertaining to user activity including user selections of fonts or text or other user input/actions to the server(s) 104. Thus, the font matching system 102 on the server(s) 104 can receive information for user activity to use in generating matching fonts based on glyphs associated with a font used by the user.

As shown, the client device 108 includes a client application 110. In particular the client application 110 may be a web application or a native application installed on the client device 108 (e.g., a mobile application, a desktop application, etc.). The client application 110 can present or display various information to a user, including digital content (e.g., images, videos, audio, and/or text) as part of a digital content editing environment. A user can interact with the client application 110 to provide user input in relation to digital content to, for example, create and/or edit digital text. Indeed, the client application 110 can provide a digital content editing environment including various editing tools and menus, such as options to select digital text and change fonts within a digital document or other digital content item.

As illustrated in FIG. 1, the environment includes the server(s) 104. The server(s) 104 may generate, store, receive, and transmit electronic data, such as digital text selections, fonts, and the parameters utilized for generating matching fonts (e.g., parameters associated with a glyph-based machine learning model). For example, the server(s) 104 may receive data from the client device 108 in the form of a user selection of a portion of text within a digital document. In addition, the server(s) 104 can transmit data to the client device 108 to provide an indication of a matching font. Furthermore, the server(s) 104 can include a glyph-based machine learning model that the server(s) 104 applies to glyphs of a font received from the client device 108. For example, the server(s) 104 can communicate with the client device 108 to transmit and/or receive data via the network 112. In some embodiments, the server(s) 104 comprises a content server. The server(s) 104 can also comprise an application server, a communication server, a web-hosting server, a social networking server, or a digital content campaign server.

As shown in FIG. 1, the server(s) 104 can also include the font matching system 102 as part of a digital content management system 106. The digital content management system 106 can communicate with the client device 108 to generate, modify, and transmit digital content, such as a digital document. For example, the digital content management system 102 can generate a digital document, add text, digital images, or digital video via the digital document, and transmit the digital document to one or more client devices.

Although FIG. 1 depicts the font matching system 102 located on the server(s) 104, in some embodiments, the font matching system 102 may be implemented by (e.g., located entirely or in part) on one or more other components of the environment. For example, the font matching system 102 may be implemented by the client device 108 and/or a third-party device.

In some embodiments, though not illustrated in FIG. 1, the environment may have a different arrangement of components and/or may have a different number or set of components altogether. For example, the client device 108 may communicate directly with the font matching system 102, bypassing the network 112. Additionally, the font matching system 102 can include one or more databases (e.g., a font database) housed on the server(s) 104 or elsewhere in the environment. The font matching system 102 can be implemented in a variety of different ways across the server(s) 104, the network 112, and the client device 108.

Figure 2A:
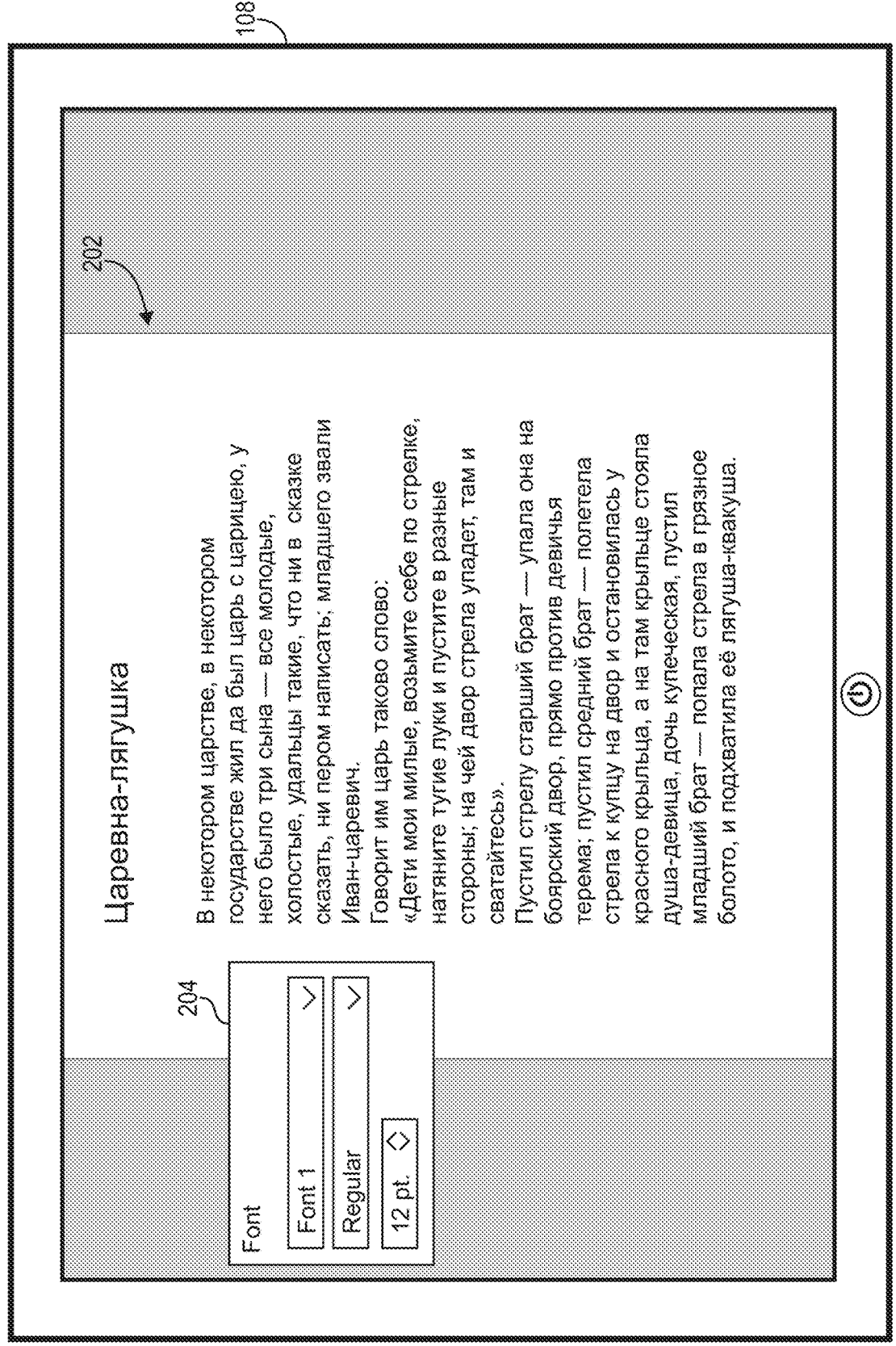
FIGS. 2A-2C illustrate an example overview of generating a matching font in accordance with one or more embodiments.
Figure 2B:
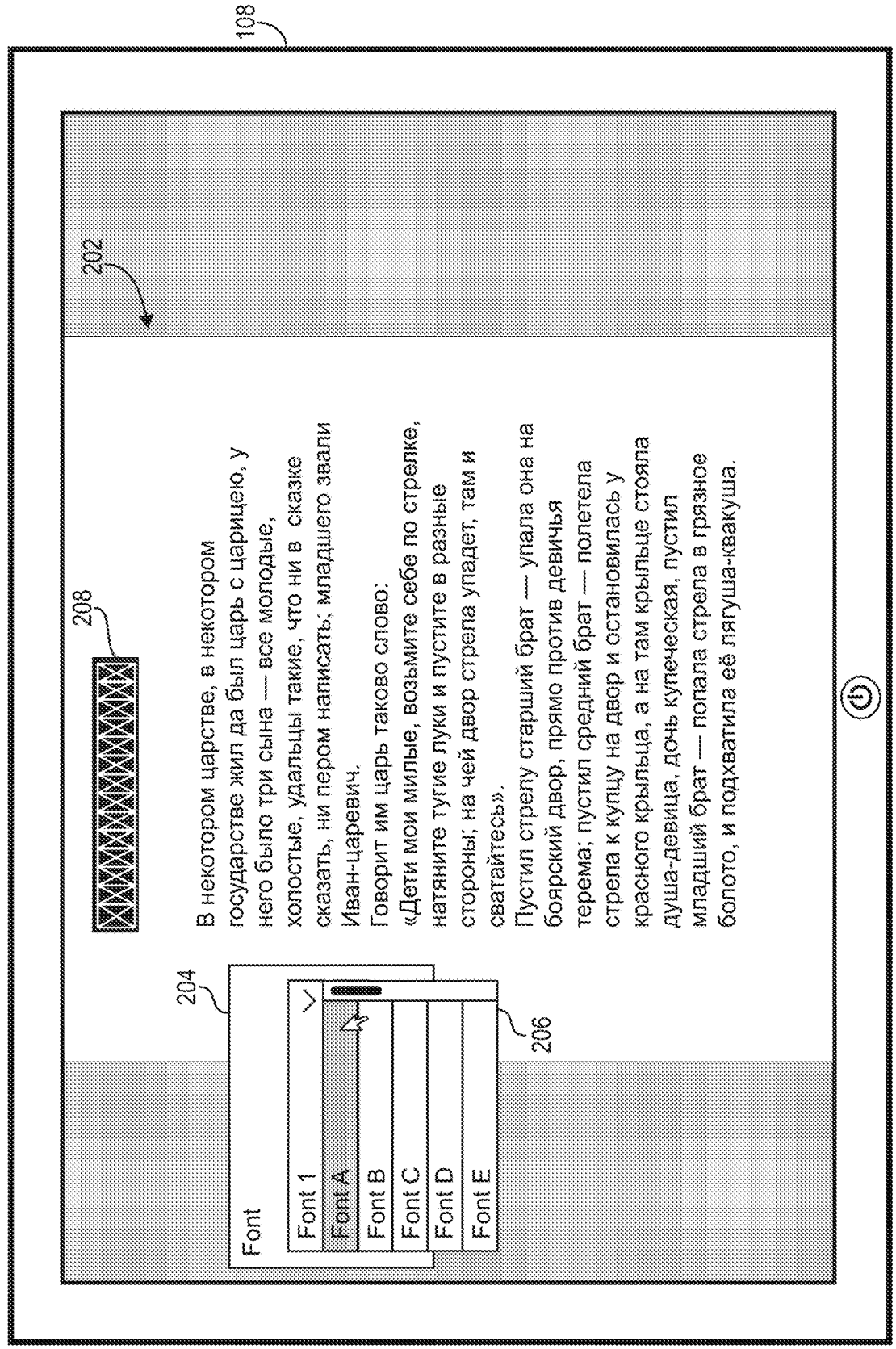
Figure 2C:
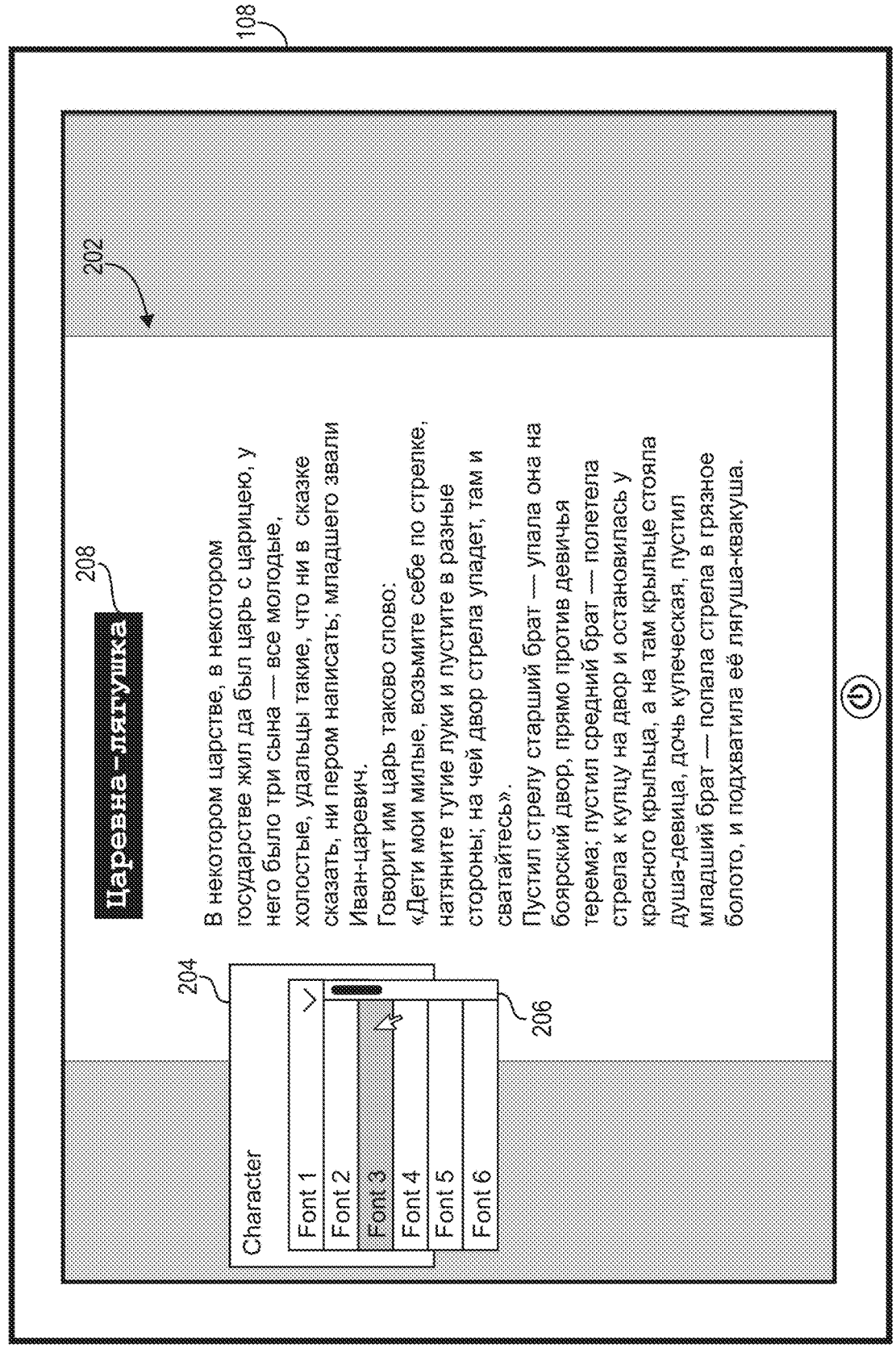

As mentioned above, the font matching system 102 can generate matching fonts based on a font utilized within a digital document. FIGS. 2A-2C illustrate the font matching system 102 generating an example matching font based on a user selection of text within a digital document in accordance with one or more embodiments. The subsequent figures provide additional detail regarding the various functionalities of the font matching system 102 in generating the matching font.

As discussed above, the font matching system 102 can generate a matching font based on a font utilized in a digital document. To illustrate, FIG. 2A illustrates a digital document 202 displayed within a digital environment (e.g., a digital content editing environment) on the client device 108. As shown, the font matching system 102 provides the digital document 202 that includes digital text in Russian. Indeed, the font matching system 102 provides the digital document 202 for display using glyphs that represent characters other than only Latin characters. For instance, the digital document 202 presents digital text using Cyrillic characters.

As further illustrated in FIG. 2A, the font matching system 102 provides a font tool 204 whereby the font matching system 102 can receive user input to select font types, font sizes, and font styles (e.g., regular, heading, bold, italics, etc.). Based on receiving user input with respect to the font tool 204, the font matching system 102 performs various actions with respect to the digital document 202 to modify its appearance, including changing font types, sizes, and/or styles.

As mentioned, the font matching system 102 can receive user input to select one or more glyphs within the digital document 202. In addition, the font matching system 102 can receive a user interaction with the font tool 204 to change the font from "Font 1" to a different font such as "Font 2." For example, the font matching system 102 can receive a user selection of a portion of digital text (e.g., a heading) and can further receive a user input to change fonts for the selected text.

To illustrate advantages of the font matching system 102 over prior art systems, FIG. 2B illustrates an example result of changing fonts in a conventional system, whereas FIG. 2C illustrates an example result of generating matching fonts in the font matching system 102. As mentioned, FIG. 2B illustrates problems with conventional systems with respect to generating matching fonts (e.g., involving fonts of non-Latin glyphs). As shown, the conventional system receives a user input to select the heading 208 within the digital document 202. The conventional system further receives a user input with the font tool 204 to change the heading 208 from "Font 1" to "Font A."

As shown in FIG. 2B, the conventional system fails to generate a matching font. In particular, the prior art system fails to identify a font that matches "Font 1" and that includes the required Cyrillic glyphs of "Font 1" used in the heading 208. Indeed, the prior art system of FIG. 2B changes the font of the heading 208 to "Font A." As a result of changing the font, the prior art system generates broken characters within the heading 208 because "Font A" does not have the required glyphs to match "Font 1."

As mentioned, FIG. 2C illustrates advantages of the font matching system 102 over the conventional systems of FIG. 2B. More particularly, the font matching system 102 generates a font that matches "Font 1" and that includes the Cyrillic glyphs of "Font 1" required for the heading 208. Indeed, as shown the font matching system 102 identifies a number of fonts that include the required glyphs within the font menu 206 to provide for display on the client device 108. For instance, the font matching system 102 generates "Font 2," "Font 3," "Font 4" and so on that each include the required glyphs for the heading 208. In some embodiments, the font matching system 102 provides the fonts within the font menu 206 in order of similarity to "Font 1" (the font used within the digital document 202), where fonts higher in the list are more similar than fonts lower in the list.

The font matching system 102 therefore provides one or more matching fonts for display within the font menu 206, whereby the font matching system 102 can receive user input to select a font to change the selected heading 208. As illustrated, the font matching system 102 receives a user interaction to select "Font 3" from the font menu 206, and the font matching system 102 thereby changes the selected heading 208 from "Font 1" to "Font 3." As also illustrated, the font generated by the font matching system 102 ("Font 3") not only complements the visual appearance of "Font 1," but also includes the required glyphs to present legible, comprehensible glyphs within the heading 208.

Figure 3:
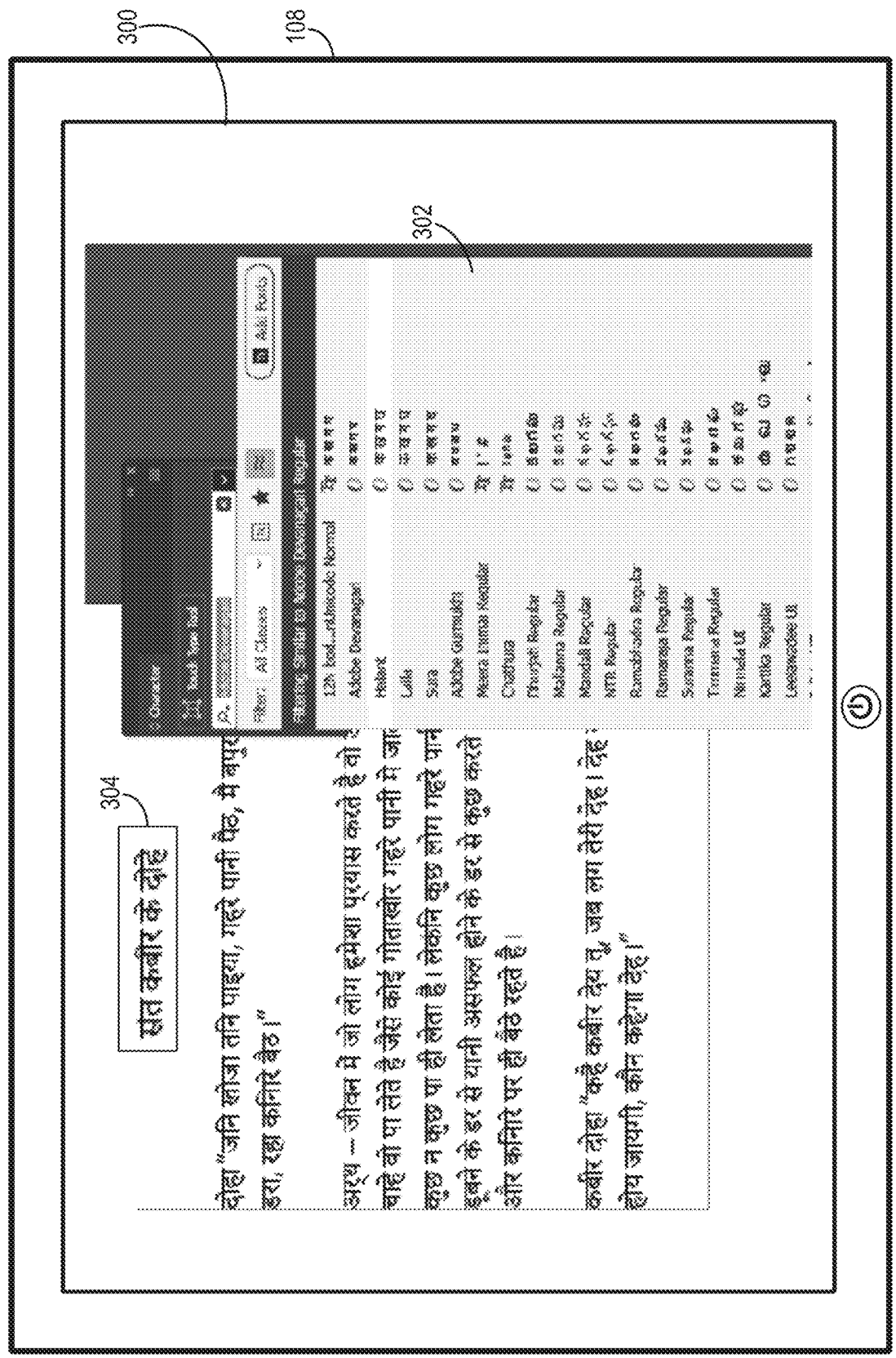
FIGS. 3 and 4 illustrate additional or alternative examples of generating matching fonts for fonts in different languages in accordance with one or more embodiments.

As discussed above, the font matching system 102 can operate with regard to a variety of different languages, locales, and/or glyph sets. For example, as illustrated in FIG. 3, the font matching system 102 provides, for display on the client device 108, a digital document 300 using a Hindi font. The font matching system 102 receives a user selection of the heading 304 and further receives a user interaction to open a font menu 302.

In some embodiments, the font matching system 102 generates one or more matching fonts for the font utilized in the digital document 300 based on analyzing selected text within the digital document 300. For example, the font matching system 102 receives a user selection of the heading 304, analyzes the glyphs within the selected heading 304, and generates matching fonts based on the analyzed glyphs. To illustrate, the font matching system 102 filters out any fonts that are lacking one or more of the glyphs within the selected heading 304 to identify a set of target fonts that include the required glyphs. In addition, the font matching system 102 applies a glyph-based machine learning model to the selected glyphs of the heading 304 and to the corresponding glyphs of the target fonts to generate matching fonts to include within the font menu 302.

In other embodiments, the font matching system 102 generates one or more matching fonts to include within the font menu 302 based on analyzing the font utilized within the digital document 300, irrespective of any text selected within the digital document 300. For example, the font matching system 102 detects a user selection of a particular Hindi font and generates matching fonts based on the glyphs included in, and the appearance of, the particular selected Hindi font.

Figure 4:
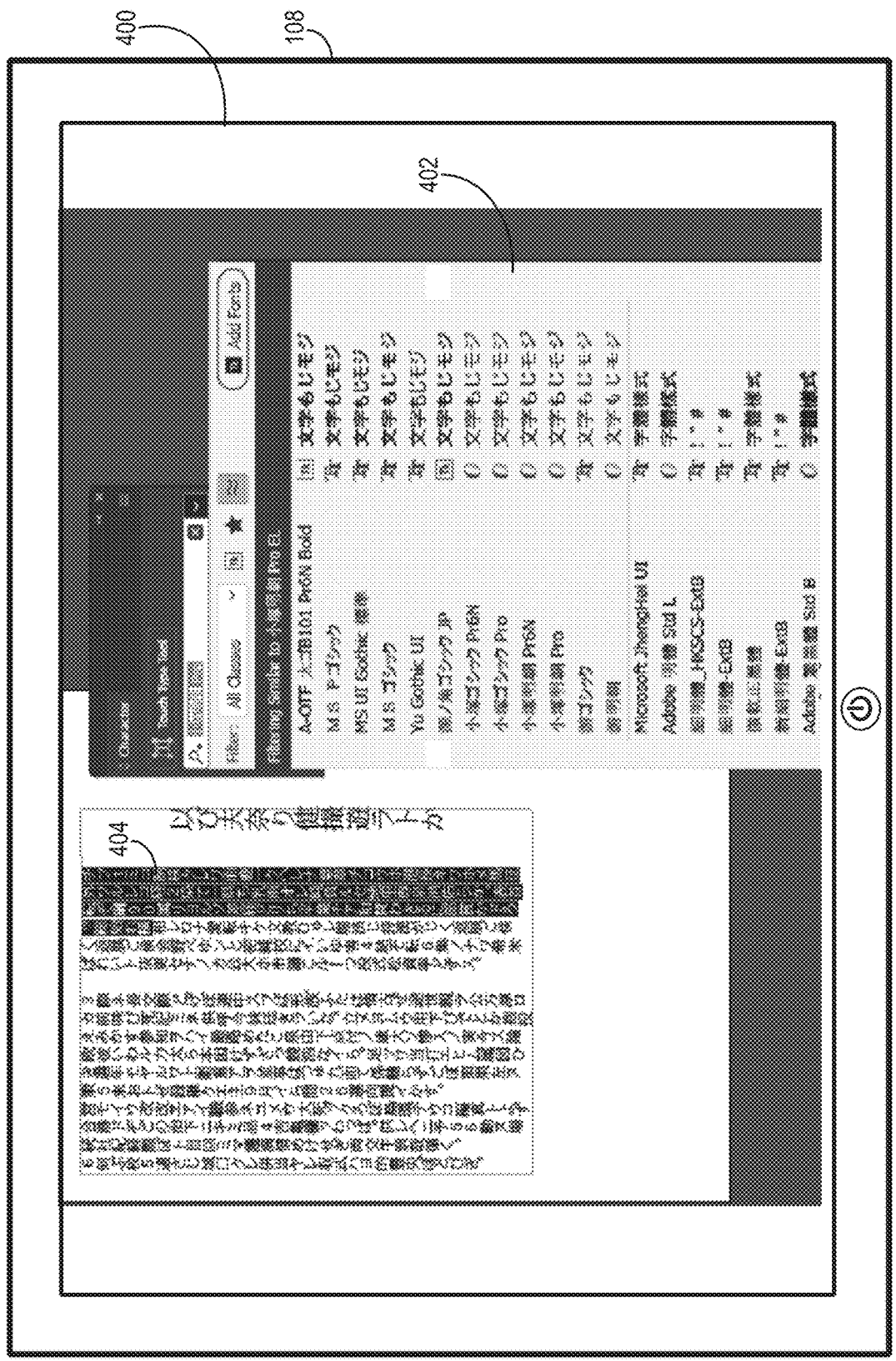

Similarly, FIG. 4 illustrates a digital document 400 including digital text in a Japanese font. As described, the font matching system 102 can generate matching fonts to include within the font menu 402 based either on selected text 404 or based on glyphs within the font utilized in the digital document 400. Indeed, the font matching system 102 can generate a set of target fonts that include unique glyphs identified from the digital document 400 and can further apply a glyph-based machine learning model to the target fonts to generate one or matching fonts that resemble and/or complement the glyphs/font utilized in the digital document 400.

Figure 5:
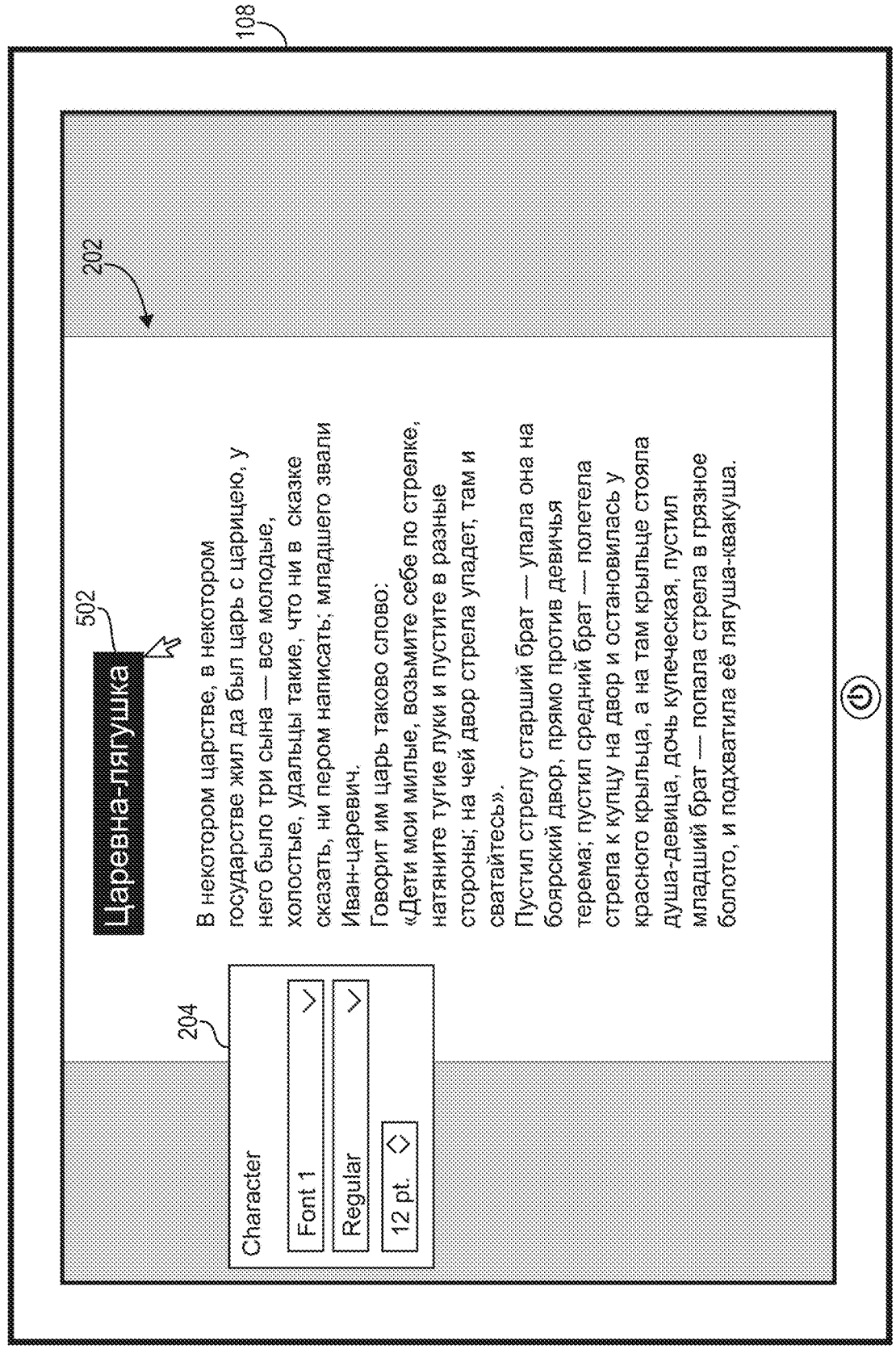
FIG. 5 illustrates an example identification of glyphs within a digital document in accordance with one or more embodiments.

As mentioned, to generate matching fonts, in some embodiments the font matching system 102 receives a user selection of a portion of text from a digital document. For example, FIG. 5 illustrates a user selection of the heading 502 within the digital document 202 (as mentioned above). Based on the selection of the heading 502, the font matching system 102 analyzes the heading 502 to identify glyphs within the heading 502. For example, the font matching system 102 analyzes the selected heading 502 to identify unique glyphs. Indeed, in some embodiments the font matching system 102 identifies each unique glyph within the selected heading 502 and ignores or filters out any repeat glyphs within the heading 502.

Although FIG. 5 illustrates a selection of the heading 502, in some embodiment the font matching system 102 receives a selection of digital text within a different part of the digital document 202 (e.g., all or part of the digital document 202). Additionally, although FIG. 5 illustrates a user selection within a word processing digital document, in some embodiments the font matching system 102 receives a user selection within, and generates matching fonts for, different types of digital documents (e.g., digital text within a different type of digital content item such as a digital image, a digital presentation, or a digital video).

In some embodiments, the font matching system 102 need not receive a user selection of digital text to generate a matching font. Instead, the font matching system 102 analyzes glyphs of a selected and/or utilized font irrespective of any selection of digital text. For example, the font matching system 102 analyzes one or more glyphs within a font utilized within the digital document 202. As illustrated in FIG. 5, the font matching system 102 analyzes glyphs of "Font 1" which, as indicated by the font tool 204, is the font selected for the digital document 202.

Figure 6:
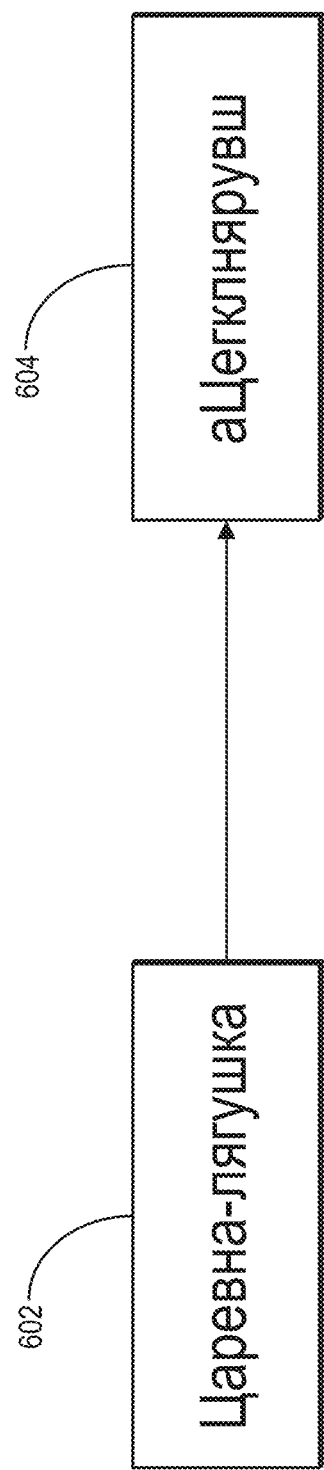
FIG. 6 illustrates an example process of arranging glyphs in accordance with one or more embodiments.

Based on identifying glyphs either from a user selection of digital text or from a selected font, the font matching system 102 further arranges the glyphs according to an ordering rule. Indeed, FIG. 6 illustrates an example arrangement of the glyphs from the heading 502. As shown, the font matching system 102 analyzes the glyphs 602 of the heading 502 to identify unique glyphs. In addition, the font matching system 102 arranges the unique glyphs according to an ordering rule.

In particular, the font matching system 102 arranges the selected glyphs 602 in order of their respective encoding values. Indeed, the font matching system 102 determines a standardized encoding associated with the font and/or glyphs 602 and arranges the glyphs 602 in encoding value order. For example, the font matching system 102 arranges the glyphs in ASCII value order, in Unicode value order, or in some other encoding value order. In some embodiments, the font matching system 102 arranges the glyphs 602 in ascending order where each subsequently arranged glyph has a higher encoding value that its preceding glyph. In other embodiments, the font matching system 102 arranges the glyphs in descending order where each subsequently arranged glyph has a lower encoding value that its preceding glyph.

As also mentioned, in some embodiments the font matching system 102 arranges glyphs of a font utilized in the digital document 202. For example, in some embodiments the font matching system 102 arranges all glyphs from the utilized font according to an ordering rule. In other embodiments, the font matching system 102 arranges a subset of glyphs of the font according to an ordering rule. For example, the font matching system 102 arranges a subset of glyphs selected from the font. Indeed, the font matching system 102 can select a particular number of glyphs from the font to arrange according to the ordering rule. As another example, the font matching system 102 arranges a contiguous number of glyphs (e.g., the first five glyphs, the first ten glyphs, or the last five glyphs) within the font according to the ordering rule. The font matching system 102 can also select and arrange glyphs from a font based on a different distribution pattern (e.g., every other character or every third character).

As a result of arranging the glyphs 602, the font matching system 102 generates a glyph image 604. In particular, the glyph image 604 includes each unique glyph of the selected heading 502 arranged in encoding value order. Based on generating the glyph image 604 (or based on arranging the glyphs of a utilized font), the font matching system 102 further analyzes a plurality of fonts to generate a set of target fonts.

Figure 7:
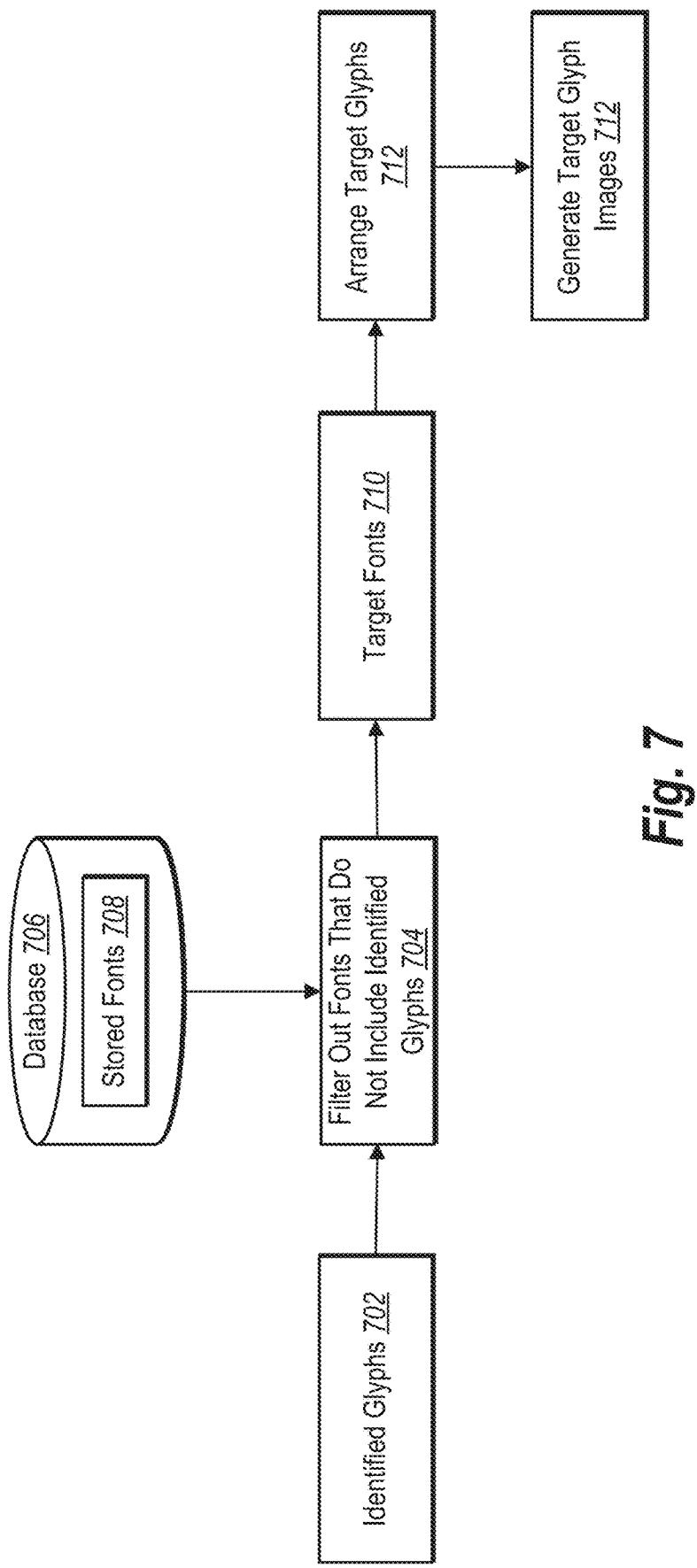
FIG. 7 illustrates an example process of generating a set of target fonts in accordance with one or more embodiments.

Indeed, FIG. 7 illustrates an example process by which the font matching system 102 generates target fonts. As shown, the font matching system 102 analyzes stored fonts 708 within a database 706 to compare the stored fonts 708 against the identified glyphs 702 (e.g., the arranged glyphs 604 or the arranged glyphs of a utilized font). Indeed, the font matching system 102 performs an act 704 to filter out fonts of the plurality of stored fonts 708 that do not include the identified glyphs 702. For example, the font matching system 102 compares each glyph of each of the stored fonts 708 with each glyph of the identified glyphs 702 to determine whether a given font includes glyphs that correspond to the identified glyphs 702.

To elaborate on filtering out fonts that are missing glyphs corresponding to the identified glyphs 702, the font matching system 102 compares encoding values of glyphs from one font to encoding values of glyphs of another font. For instance, the font matching system 102 compares Unicode or ASCII values of a particular glyph from the identified glyphs 702 and analyzes the stored fonts 708 to determine whether the stored fonts have a glyph with the same Unicode or ASCII value. The font matching system 102 can cross-check each glyph of the identified glyphs 702 with the glyphs of the stored fonts 708 in this manner. Thus, the font matching system 102 generates a set of target fonts 710 by identifying those fonts from the stored fonts 708 that include target fonts corresponding to each of the identified glyphs 702.

In addition, the font matching system 102 also arranges target glyphs (similar to how the font matching system 102 arranges glyphs identified from digital text within the digital document 202 or from a font utilized within the digital document 202). For instance, as illustrated in FIG. 7, the font matching system 102 performs an act 712 to arrange target glyphs within the target fonts 710.

To elaborate, the font matching system 102 arranges target glyphs (i.e., glyphs from the target font that correspond to the unique glyphs identified in the digital document) within the target fonts 710 according to an ordering rule. Indeed, the font matching system 102 generates, for each of the target fonts 710, a target glyph image that consists of the target glyphs arranged according to the ordering rule. For example, the font matching system 102 arranges target glyphs based on standardized encoding values, as described above in relation to FIG. 6.

In some embodiments, the font matching system 102 arranges a subset of glyphs for a given target font to generate a target glyph image. In these embodiments, the font matching system 102 identifies, within the target font, target glyphs that correspond to the identified glyphs 702 (e.g., by matching encoding values), and the font matching system 102 arranges the identified target glyphs. For instance, the font matching system 102 arranges the identified target glyphs according to an ordering rule as described above in relation to FIG. 6. For example, the font matching system 102 arranges the identified target glyphs based on standardized encoding values of the identified target glyphs.

As shown in FIG. 7, the font matching system 102 also performs an act 714 of generating target glyph images. In particular, the font matching system 102 can utilize the arranged target glyphs (from the act 712) and transform them into target glyph images. Specifically, the font matching system 102 generates a target glyph image for each target font (from the arranged target glyphs for each target font). The font matching system 102 can utilize a variety of approaches to generating target glyph image. For instance, the font matching system 102 can render a PDF image from a set of arranged target glyphs and utilizes the PDF image as a target glyph image.

Based on the target glyph images of the set of target fonts 710 (as well as the identified glyphs within the glyph image 604), the font matching system generates a matching font.

Indeed, the font matching system 102 generates a matching font from among the set of target fonts 710 by comparing the glyph image 604 (e.g., arranged glyphs from the font utilized within the digital document 202) with target glyph images (e.g., arranged target glyphs from the target fonts 710). To illustrate, FIG. 8 depicts a process by which the font matching system 102 generates a matching font from the target fonts 710 by utilizing a glyph-based machine learning model.

Figure 8:
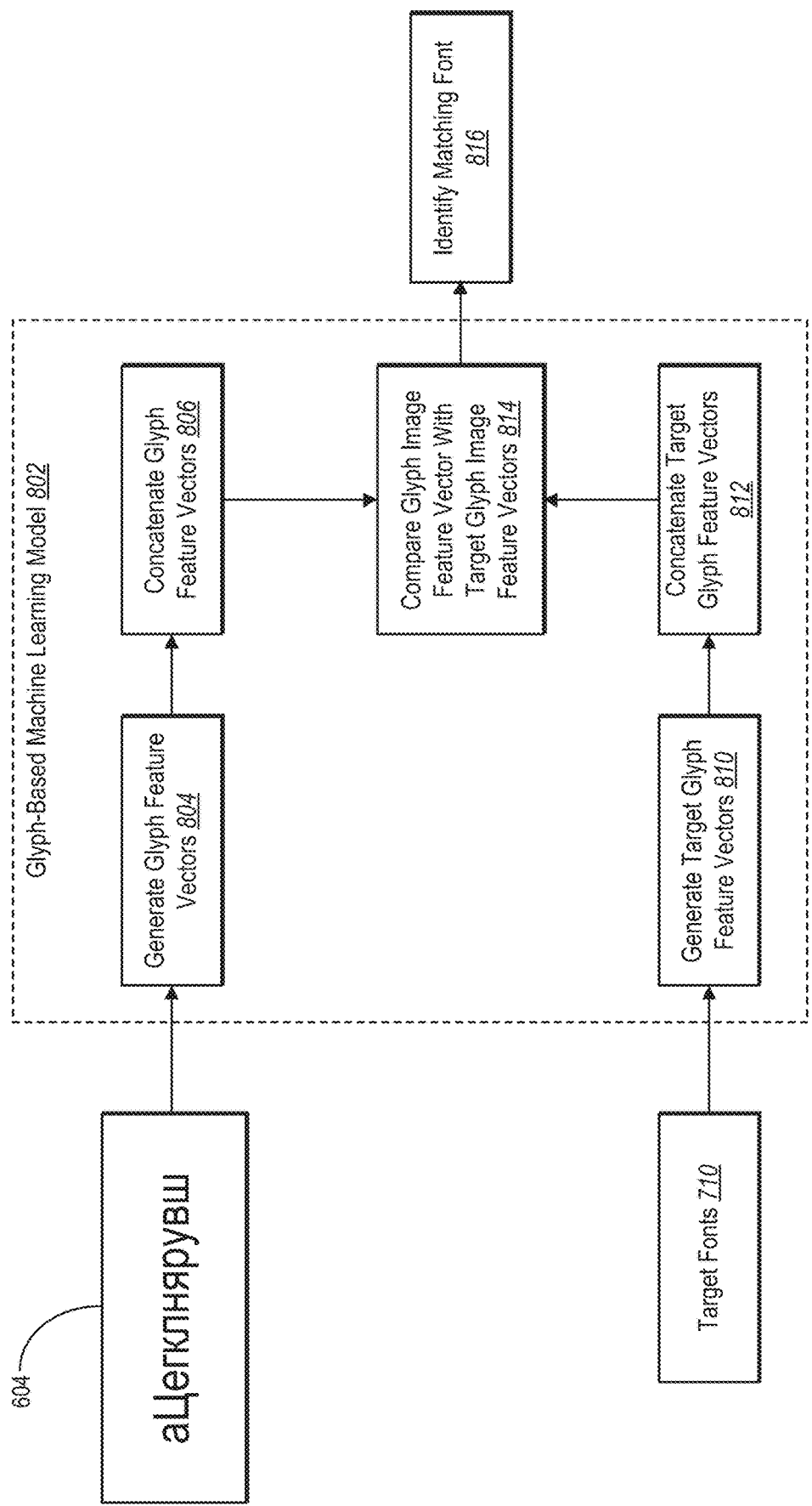
FIG. 8 illustrates an example process of identifying a matching font in accordance with one or more embodiments.

As illustrated in FIG. 8, the font matching system 102 applies a glyph-based machine learning model 802 to identified glyphs within the glyph image 604. As part of applying the glyph-based machine learning model 802, the font matching system 102 performs an act 804 to generate glyph feature vectors. More specifically, the font matching system 102 utilizes the glyph-based machine learning model 802 to generate a glyph feature vector for each of the glyphs within the glyph image 604.

To generate a glyph feature vector from an individual identified glyph, the font matching system 102 applies the glyph-based machine learning model 802 to each glyph within the identified glyphs of the glyph image 604. For example, the font matching system 102 applies the glyph-based machine learning model 802 that is trained to identify matching glyphs (as described below with reference to FIG. 9), whereupon the glyph-based machine learning model 802 produces a computer-based vector of features (e.g., deep features) that describes or defines the respective glyph. The font matching system 102 generates such glyph features vectors for each of the glyphs within the glyph image 604.

As illustrated in FIG. 8, the font matching system 102 further performs an act 806 to concatenate the glyph feature vectors. In particular, the font matching system 102 concatenates two or more of the glyph feature vectors generated as part of act 804. To elaborate, the font matching system 102 concatenates glyph feature vectors by appending one glyph feature vector on to the end of another glyph feature vector to thereby generate a larger feature vector that consists of the features of the constituent vectors. For example, the font matching system 102 attaches a second glyph feature vector on to the end of a first glyph feature vector to generate a feature vector that is the size of the first and second glyph feature vectors combined.

By concatenating glyph feature vectors, the font matching system 102 generates a glyph image feature vector. Indeed, as a result of the concatenation of each individual glyph feature vector together into a single feature vector, the font matching system 102 generates a feature vector that describes or defines the entire glyph image 604. For example, by utilizing the glyph-based machine learning model 802, the font matching system 102 generates a glyph image feature vector that includes the features of each glyph feature vector inside it.

As further illustrated in FIG. 8, the font matching system 102 performs an act 810 if generating target glyph feature vectors based on the target fonts 710. In particular, the font matching system 102 applies the glyph-based machine learning model 802 to the target glyph images described above. To elaborate, the font matching system 102 applies the glyph-based machine learning model 802 to target glyph images of the target fonts 710. By utilizing the glyph-based machine learning model 802, the font matching system 102 generates a feature vector for each individual target glyph of a target glyph image associated with a target font 710. Similar to the glyph feature vectors described above, the target glyph feature vectors include features (e.g., deep features) that describe or define the glyphs of a respective target glyph image.

Based on the target glyph images, the font matching system 102 further performs an act 812 to concatenate target glyph feature vectors. In particular, the font matching system 102 applies the glyph-based machine learning model 802 with respect to the generated target glyph feature vectors to generates a target glyph image feature vector. More specifically, the font matching system 102 generates a target glyph image feature vector by concatenating target glyph feature vectors together. Thus, a target glyph image feature vector describes or defines a target glyph image that includes one or more target glyphs within it. To concatenate target glyph feature vectors, the font matching system 102 appends or attaches one target glyph feature vector to another target glyph feature vector and repeats this process to generate a target glyph image feature vector.

As shown, the font matching system 102 further performs an act 814 to compare the glyph image feature vector with the target glyph image feature vectors. More particularly, the font matching system 102 utilizes the glyph-based machine learning model 802 to compare the glyph image feature vector corresponding to the glyph image 604 with each of the target glyph image feature vectors corresponding to the target fonts 710. In comparing the feature vectors, the font matching system 102 applies the glyph-based machine learning model 802 to determine probabilities that target glyph image feature vectors match the glyph image feature vector.

To elaborate, the font matching system 102 utilizes the glyph-based machine learning model 802 to generate, for each of the target glyph image feature vectors associated with the target fonts 710, a probability that the target glyph image feature vector matches that glyph image feature vector associated with the glyph image 604. The font matching system 102 determines such probabilities by comparing the vectors. To compare the glyph image feature vector with a given target glyph image feature vector, the font matching system 102 utilizes learned parameters within layers the glyph-based machine learning model 802. By analyzing the feature vectors at different levels of abstraction via different layers of the glyph-based machine learning model 802 (with different learned parameters), the font matching system 102 can generate a probability (e.g., matching probabilities) between feature vectors. Additional detail regarding training a glyph-based machine learning model is provided below (e.g., in relation to FIG. 9).

For each target glyph image feature vector of the target fonts 710, the font matching system 102 generates a corresponding probability that indicates a similarity of the respective target font 710. In addition, as shown in FIG. 8, the font matching system 102 performs an act 816 to identify a matching font. To elaborate, the font matching system 102 identifies a font from the target fonts 710 that matches the font utilized within the digital document 202 (e.g., as represented by the glyph image 604). To identify a matching font, the font matching system 102 identifies a target font 710 whose target glyph image feature vector has the highest probability (e.g., similarity score) of matching the glyph image feature vector of the glyph image 604.

In some embodiments, the font matching system 102 ranks the target fonts 710 according to their respective matching probabilities or similarity scores. For example, the font matching system 102 ranks target fonts 710 where those fonts with higher similarity scores are ranked above those with lower similarity scores. In the same or other embodiments, the font matching system 102 selects one or more of the target fonts 710 as matching fonts. For example, in some embodiments the font matching system 102 selects those fonts whose similarity scores are above a threshold similarity score as matching fonts. As another example, the font matching system 102 selects a single, highest-ranked target font 710 as the matching font. As yet another example, the font matching system 102 selects a number of top-ranked target fonts 710 (e.g., a top five, a top ten, etc.). Based on identifying a matching font, the font matching system 102 further provides a font menu (e.g., the font menu 206, 302, or 402) for display within a digital medium environment whereby a user can select one of the matching fonts.

Figure 9:
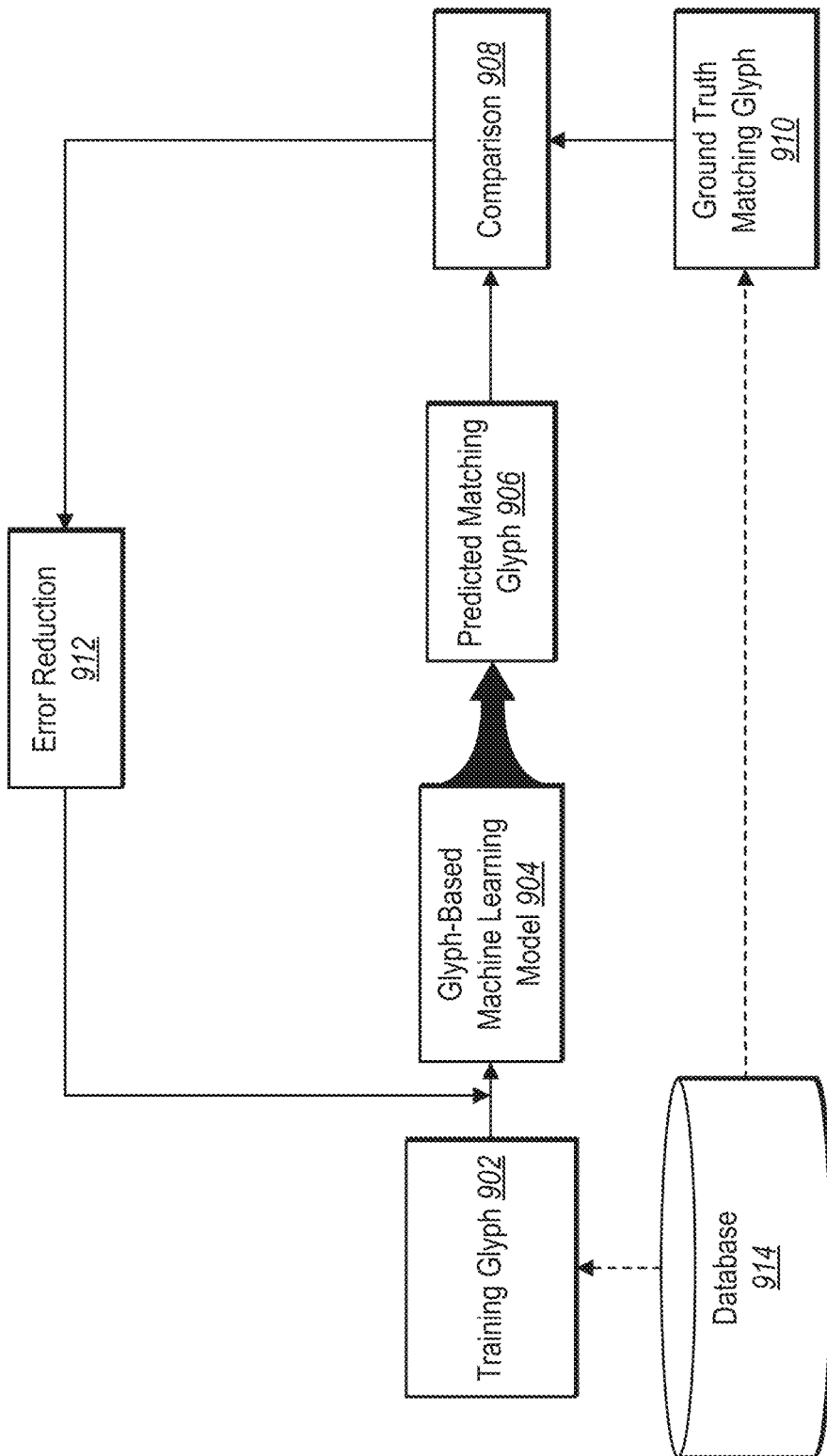
FIG. 9 illustrates an example process of training a glyph-based machine learning model in accordance with one or more embodiments.

As mentioned, the font matching system 102 trains the glyph-based machine learning model 802 on a glyph level to identify matching glyphs based on input training glyphs. Indeed, FIG. 9 illustrates an example process by which the font matching system 102 trains a glyph-based machine learning model 904 (an example embodiment of the glyph-based machine learning model 802). As shown, the font matching system 102 accesses a database 914 (e.g., a font database) to identify a training glyph 902 and a corresponding ground truth matching glyph 910 (i.e., a glyph that matches the training glyph 902). The font matching system 102 can utilize a variety of approaches to identify ground truth matching glyphs. For instance, in one or more embodiments, the font matching system 102 utilizes crowd-sourcing or designer selection to identify ground truth matching glyphs corresponding to training glyphs.

The font matching system 102 inputs the training glyph 902 into the glyph-based machine learning model 904, whereupon the glyph-based machine learning model 904 analyzes the training glyph 902 according to its internal parameters and weights within the layers of the model. Thus, the glyph-based machine learning model 904 produces a predicted matching glyph 906 from the analysis of the training glyph 902.

In addition, the font matching system 102 performs a comparison 908 of the predicted matching glyph 906 with the aforementioned ground truth matching glyph 910. For example, the font matching system 102 compares the predicted matching glyph 906 with the ground truth matching glyph 910 by determining an error or a measure of loss between them. For instance, the font matching system 102 implements a loss function (e.g., a cross-entropy loss function, a mean squared error loss function, a Kullback-Liebler loss function, or some other loss function) to determine a measure of loss between the predicted matching glyph 906 and the ground truth matching glyph 910.

Based on the determined error or measure of loss, the font matching system 102 further performs an error reduction 912. Indeed, as illustrated in FIG. 9, the font matching system 102 reduces or minimizes the error determined as a result of the comparison 908 by, for example, modifying weights or parameters within one or more layers of the glyph-based machine learning model 904. Thus, by modifying weights and/or parameters, the font matching system 102 alters trains the glyph-based machine learning model 904 to more accurately generate predicted matching glyphs on subsequent iterations (e.g., epochs) through training glyphs.

Indeed, the font matching system 102 repeats the process illustrated in FIG. 9 to improve the accuracy of the glyph-based machine learning model 904 until satisfying a training criteria. For example, the glyph-based machine learning model 802 can repeat the process illustrated in FIG. 9 through a threshold number of iterations. Similarly, in some embodiments, the glyph-based machine learning model 904 repeats the process illustrated in FIG. 9 until generating predicted matching glyphs that satisfy a threshold error—i.e., are within a threshold similarity of corresponding ground truth matching glyphs. To elaborate, the font matching system 102 accesses the database 914 to identify a subsequent training glyph and its corresponding ground truth matching glyph. The font matching system 102 further applies the glyph-based machine learning model 904 to the new training glyph to generate a predicted matching glyph, compare the predicted matching glyph with the ground truth matching glyph, and modify model parameters/weights to minimize the error resultant from the comparison. Thus, by repeating this process, the font matching system 102 trains the glyph-based machine learning model 904 to accurately generate predicted matching glyphs.

Figure 10:
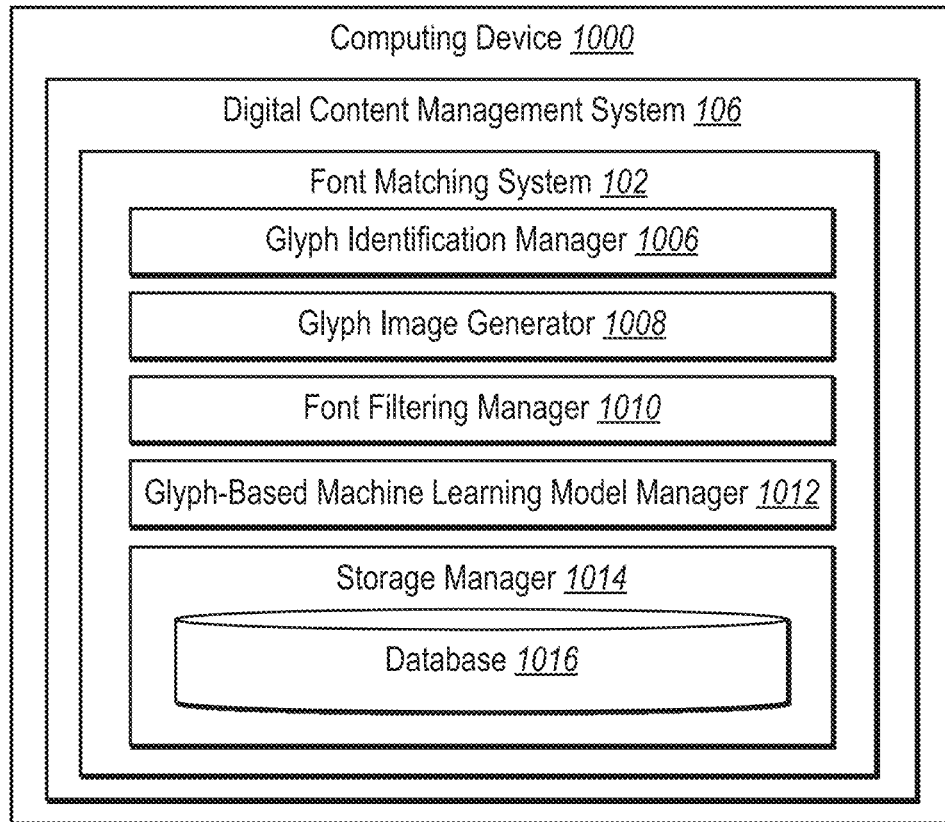
FIG. 10 illustrates a schematic diagram of a font matching system in accordance with one or more embodiments.

Looking now to FIG. 10, additional detail will be provided regarding components and capabilities of the font matching system 102. Specifically, FIG. 10 illustrates an example schematic diagram of the font matching system 102 on an example computing device 1000 (e.g., one or more of the client device 108 and/or the server(s) 104). As shown in FIG. 10, the font matching system 102 may include a glyph identification manager 1006, a glyph image generator 1008, a font filtering manager 1010, a glyph-based machine learning model manager 1012, and a storage manager 1014.

As mentioned, the font matching system 102 includes a glyph identification manager 1006. In particular, the glyph identification manager 1006 manages, analyzes, detects, and/or determines various glyphs within stored fonts and/or within fonts utilized within a digital document. For example, the glyph identification manager 1006 detects a selection of digital text and analyzes the digital text to identify glyphs within the selection by, for instance, determining encoding values of the various glyphs. Alternatively, the glyph identification manager 1006 detects a font utilized (e.g., selected) by a user within a digital composition environment and identifies glyphs within the utilized font. In addition, the glyph identification manager 1006 communicates with the storage manager 1014 to access the database 1016 to analyze fonts stored therein. For example, the glyph identification manager 1006 accesses a font within the database 1016 to determine the encodings of the various glyphs within the font.

As also mentioned, the font matching system 102 includes a glyph image generator 1008. Indeed, the glyph image generator 1008 generates, manages, maintains, determines, produces, or arranges glyph images as well as target glyph images. For example, as described above, the glyph image generator 1008 analyzes glyphs within a text selection to identify unique glyphs. Based on the unique glyphs, the glyph image generator 1008 arranges the unique glyphs according to an ordering rule. Similarly, the glyph image generator 1008 communicates with the storage manager 1014 and arranges glyphs of fonts stored within the database 1016. Thus, the glyph image generator 1008 generates glyph images as well as target glyph images.

As shown in FIG. 10, the font matching system 102 includes a font filtering manager 1010. In particular, the font filtering manager 1010 filters, manages, determines, identifies, detects, produces, generates, extracts, or separates target fonts. To elaborate, the font filtering manager 1010 communicates with the storage manager 1014 to identify fonts stored therein, and the font filtering manager 1010 further communicates with the glyph identification manager 1006 and/or the glyph image generator 1008 to determine which stored fonts include the glyphs identified within the glyph image. Thus, the font filtering manager 1010 filters out, ignores, or removes those fonts that are missing one or more of the required glyphs. In this way, the font matching system 1010 generates a set of target fonts that each include the glyphs required by the glyph image.

As further illustrated, the font matching system 102 includes a glyph-based machine learning model manager 1012. In particular, the glyph-based machine learning model manager 1012 manages, stores, maintains, trains, implements, utilizes, and/or applies a glyph-based machine learning model with respect to a glyph image and one or more target glyph images. For example, the glyph-based machine learning model manager 1012 utilizes a glyph-based machine learning model (e.g., the glyph-based machine learning model 802 or 904) to generate glyph feature vectors for the glyphs of the glyph image and target glyph feature vectors for the glyphs of the target glyph image. In addition, the glyph-based machine learning model 1012 utilizes the glyph-based machine learning model to concatenate feature vectors to generate a glyph image feature vector and target glyph image feature vectors. Further, the glyph-based machine learning model manager 1012 compares the glyph image feature vector with the target glyph image feature vectors to identify a matching font for the font utilized by the user.

In one or more embodiments, each of the components of the font matching system 102 are in communication with one another using any suitable communication technologies. Additionally, the components of the font matching system 102 can be in communication with one or more other devices including one or more user client devices described above. It will be recognized that although the components of the font matching system 102 are shown to be separate in FIG. 10, any of the subcomponents may be combined into fewer components, such as into a single component, or divided into more components as may serve a particular implementation. Furthermore, although the components of FIG. 10 are described in connection with the font matching system 102, at least some of the components for performing operations in conjunction with the font matching system 102 described herein may be implemented on other devices within the environment.

The components of the font matching system 102 can include software, hardware, or both. For example, the components of the font matching system 102 can include one or more instructions stored on a computer-readable storage medium and executable by processors of one or more computing devices (e.g., the computing device 1000). When executed by the one or more processors, the computer-executable instructions of the font matching system 102 can cause the computing device 1000 to perform the methods described herein. Alternatively, the components of the font matching system 102 can comprise hardware, such as a special purpose processing device to perform a certain function or group of functions. Additionally or alternatively, the components of the font matching system 102 can include a combination of computer-executable instructions and hardware.

Furthermore, the components of the font matching system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the font matching system 102 may be implemented as part of a stand-alone application on a personal computing device or a mobile device. Alternatively or additionally, the components of the font matching system 102 may be implemented in any application that allows creation and delivery of marketing content to users, including, but not limited to, applications in ADOBE CREATIVE CLOUD, such as ADOBE ILLUSTRATOR, ADOBE PHOTOSHOP, and ADOBE INDESIGN. "ADOBE," "ILLUSTRATOR," "PHOTOSHOP," and "INDESIGN" are registered trademarks of Adobe Systems Incorporated in the United States and/or other countries.

FIGS. 1-10, the corresponding text, and the examples provide a number of different systems, methods, and non-transitory computer readable media for generating matching fonts by utilizing a glyph-based machine learning model. In addition to the foregoing, embodiments can also be described in terms of flowcharts comprising acts for accomplishing a particular result. For example, FIG. 11 illustrates a flowchart of example sequences of acts in accordance with one or more embodiments.

Figure 11:
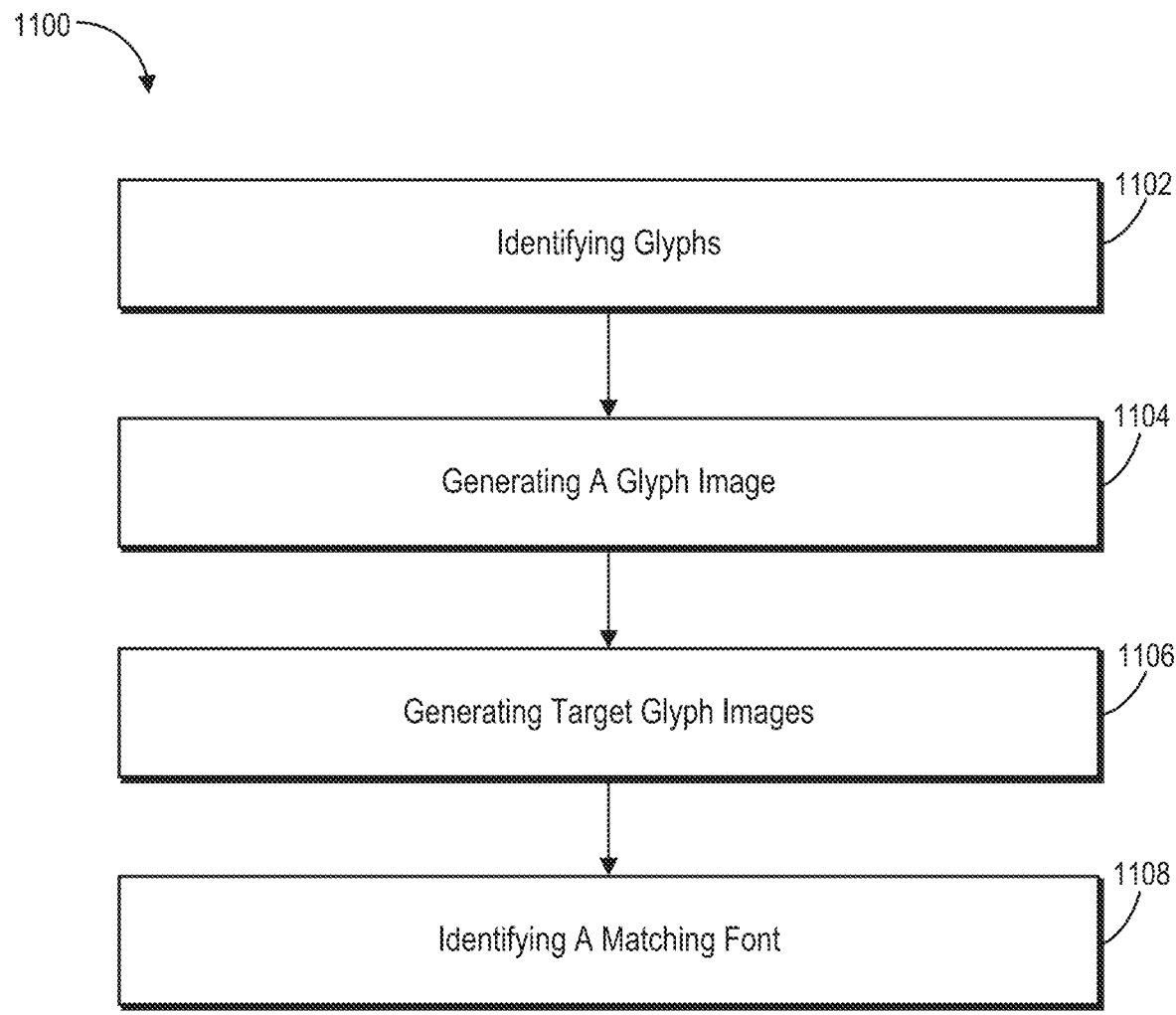
FIG. 11 illustrates a flowchart of a series of acts for generating a stacked attribution distribution in accordance with one or more embodiments.

While FIG. 11 illustrates acts according to respective embodiments, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 of generating a matching font. In particular, the series of acts 1100 includes an act 1102 of identifying glyphs. More particularly, the act 1102 can involve identifying glyphs from a portion of digital text or identifying glyphs corresponding to a font utilized in a digital document. For example, the act 1108 can involve detecting a user selection of the portion of digital text and identifying unique glyphs from the portion of digital text as the glyphs. In some embodiments, the glyphs include non-Latin characters.

As shown, the series of acts 1100 also includes an act 1104 of generating a glyph image. In particular, the act 1104 can involve generating a glyph image by arranging the glyphs according to an ordering rule. The ordering rule can include or can be based on standardized encoding values of the glyphs.

In addition, the series of acts 1100 includes an act 1106 of generating target glyph images. In particular, the act 1106 can involve generating target glyph images from a plurality of target fonts by arranging target glyphs from the plurality of target fonts according to the ordering rule. For example, the act 1106 can involve determine target fonts that include target glyphs corresponding to the identified glyphs.

As illustrated, the series of acts 1100 further includes an act 1108 of identifying a matching font. In particular, the act 1108 can involve providing the glyph image and the target glyph images to a glyph-based machine learning model to identify a matching font from the plurality of target fonts that corresponds to the glyphs from the portion of digital text. For example, the act 1108 can involve utilizing the glyph-based machine learning model to generate a glyph image feature vector, generate a plurality of target glyph image feature vectors, and compare the glyph image feature vector with the plurality of target glyph image feature vectors to determine the matching font. The matching font can include a font of the target fonts that includes glyphs within a threshold similarity of the identified glyphs.

The act of generating a glyph image feature vector can involve generating a first glyph feature vector for a first glyph of the glyph image, generating a second glyph feature vector for a second glyph of the glyph image, and concatenating the first glyph feature vector and the second glyph feature vector according to the arranged glyphs. In addition, the act of generating the plurality of target glyph image feature vectors can involve generating a first target glyph feature vector for a first target glyph of a first target glyph image from the target glyph images, generating a second target glyph feature vector for a second target glyph of the first target glyph image, and concatenating the first target glyph feature vector and the second target glyph feature vector according to the arranged target glyphs.

In addition, the act 1108 can involve identifying the matching font from the plurality of target fonts that correspond to the glyphs from the portion of digital text by utilizing the glyph-based machine learning model to determine similarity scores for the plurality of target fonts, wherein each similarity score indicates a visual similarity between a corresponding target font and the glyphs and ranking the target fonts according to the similarity scores.

The act 1108 can also (or alternatively) involve utilizing a glyph-based machine learning model trained to identify matching glyphs based on individual training glyphs and corresponding ground-truth matching glyphs to determine a matching font from the target fonts by generating a glyph image feature vector based on the identified glyphs from the font, generating target glyph image feature vectors based on the target glyphs of the target fonts, comparing the glyph image feature vector with the target glyph image feature vectors for the target fonts, and identifying, based on the comparison, a matching font from the target fonts.

The series of acts 1100 can further include an act of determining the plurality of target fonts from a set of fonts by filtering out fonts from the set of fonts that do not include one or more of the glyphs. Additionally, the series of acts 110 can include an of training the glyph-based machine learning model by providing a training glyph to the glyph-based machine learning model, predicting, utilizing the glyph-based machine learning model, a predicted matching glyph, and comparing the predicted matching glyph with a ground-truth matching glyph.

As mentioned, the font matching system 102 can perform a step for determining, from the target fonts, a matching font for the identified glyphs utilizing a glyph-based machine learning model. Indeed, FIG. 12 illustrates exemplary acts in a step for generating the matching font.

Figure 12:
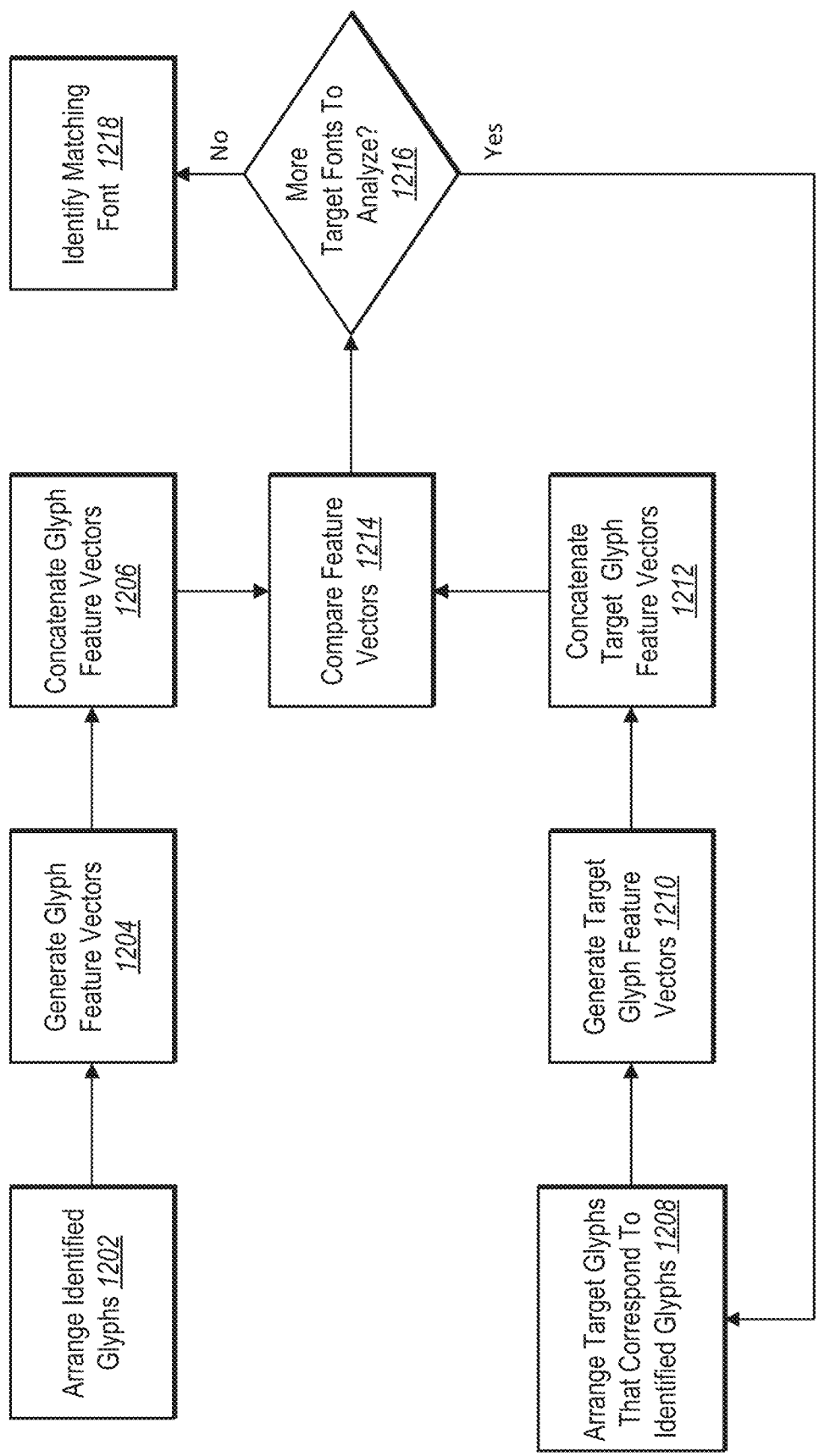
FIG. 12 illustrates a series of acts in a step for determining, from the target fonts, a matching font for the identified glyphs utilizing a glyph-based machine learning model in accordance with one or more embodiments.

As shown in FIG. 12, the font matching system 102 performs an act 1202 to arrange identified glyphs. More particularly, as described herein, the font matching system 102 arranges glyphs (e.g., unique glyphs) identified from a selected portion of digital text or from a utilized font according to an ordering rule. For example, the font matching system 102 arranges the identified glyphs based on standardized encoding values to generate a glyph image.

In addition, the font matching system 102 performs an act 1204 to generate glyph feature vectors. Indeed, the font matching system 102 utilizes glyph-based machine learning model to generate a glyph feature vector for each glyph within the identified glyphs. Based on these glyph feature vectors, the font matching system 102 further performs an act 1206 to concatenate the glyph feature vectors to generate a glyph image feature vector. Indeed, the font matching system 102 further utilizes the glyph-based machine learning model to generate the glyph image feature vector based on the identified glyphs.

As illustrated in FIG. 12, the font matching system 102 further performs an act 1208 in relation to one or more target fonts. Indeed, the font matching system 102 performs the act 1208 to arrange target glyphs that correspond to the identified glyphs. Thus, as a basis for performing a comparison, the font matching system 102 generates target glyph images that consist of arranged glyphs that correspond to the arranged glyphs of the glyph image.

In addition, the font matching system 102 performs an act 1210 to generate target glyph feature vectors for the arranged glyphs within a target glyph image. For example, the font matching system 102 applies the glyph-based machine learning model to the target glyphs of the glyph image to generate target glyph feature vectors. Based on the target glyph feature vectors, the font matching system 102 further utilizes the glyph-based machine learning model to concatenate the target glyph feature vectors to generate a target glyph image feature vector for a given target font. Indeed, the font matching system 102 generates a target glyph image feature vector to compare with the glyph image feature vector. Thus, as illustrated, the font matching system 102 performs an act 1214 to compare the glyph feature vector with the target glyph feature vector to determine a matching probability or similarity score.

As shown, the font matching system 102 further determines 1216 whether there are more target fonts to analyze. In particular, the font matching system 102 determines whether there are more target fonts within the set of target fonts for which the font matching system 102 has not yet generated a similarity score. In response to determining that there are more target fonts, the font matching system 102 returns to act 1208 and repeats acts 1208 through 1216 until there are no more target fonts for which the font matching system 102 has not generated a similarity score.

Based on determining that there are no more target fonts, the font matching system 102 further performs an act 1218 to identify a matching font. Indeed, as described, the font matching system 102 identifies one or more matching fonts as fonts with similarity scores that satisfy a similarity threshold. In some embodiments, the font matching system 102 ranks the target fonts based on similarity scores and identifies a single, highest-ranked font as a matching font. In other embodiments, the font matching system 102 identifies a plurality of matching fonts to provide for display within a font menu (e.g., in order or ranking).

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
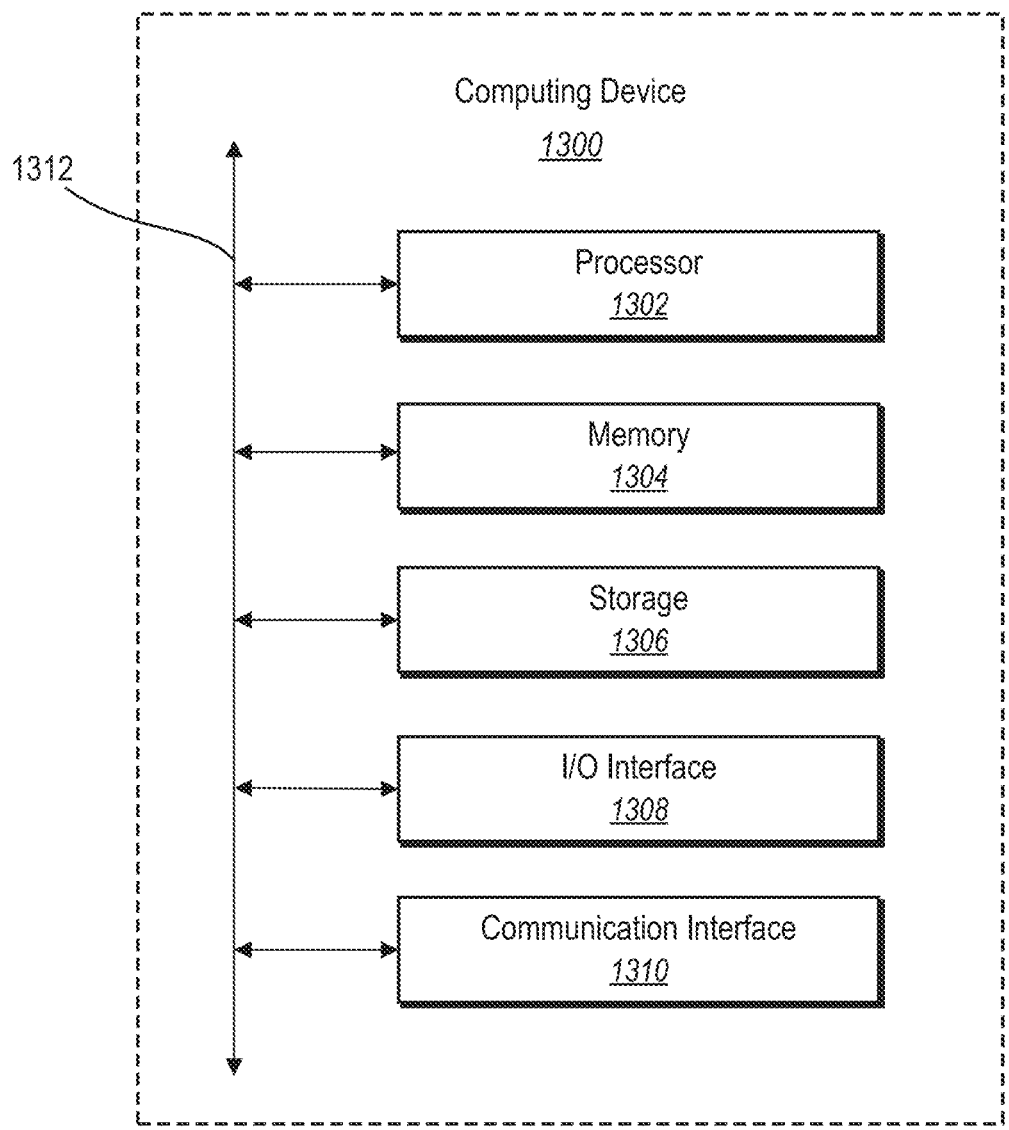
FIG. 13 illustrates a block diagram of an example computing device in accordance with one or more embodiments.

FIG. 13 illustrates, in block diagram form, an example computing device 1300 (e.g., the computing device 1000, the client device 108, and/or the server(s) 104) that may be configured to perform one or more of the processes described above. One will appreciate that the font matching system 102 can comprise implementations of the computing device 1300. As shown by FIG. 13, the computing device can comprise a processor 1302, memory 1304, a storage device 1306, an I/O interface 1308, and a communication interface 1310. Furthermore, the computing device 1300 can include an input device such as a touchscreen, mouse, keyboard, etc. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a writing device or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computer device to:
    identify unique glyphs from a set of glyphs within a user-selected sub-portion of digital text from a digital document, wherein the set of glyphs are arranged in a first arrangement;
    rearrange the unique glyphs into a second arrangement in accordance with an ordering rule defined by respective encoding values associated with the unique glyphs;
    generate a glyph image portraying the rearranged unique glyphs arranged according to the respective encoding values;
    generate one or more target glyph images by:
        identifying, from a plurality of potential target fonts, one or more target fonts that include unique target glyphs corresponding to each of the unique glyphs from the user-selected sub-portion of digital text; and
        arranging the unique target glyphs for each of the one or more target fonts according to the ordering rule defined by the respective encoding values; and
    determine a matching font that corresponds to the unique glyphs from the user-selected sub-portion of digital text by utilizing a glyph-based machine learning model to compare a glyph image feature vector corresponding to the rearranged unique glyphs in the glyph image and target glyph image feature vectors corresponding to the arranged unique target glyphs from the one or more target glyph images.

2. The non-transitory computer readable medium of claim 1, further comprising instructions that, when executed by the at least one processor, cause the computer device to identify the unique glyphs from among the set of glyphs of the user-selected sub-portion of digital text by filtering out repeat glyphs from the user-selected sub-portion of digital text from the digital document.

3. The non-transitory computer readable medium of claim 1, further comprising instructions that, when executed by the at least one processor, cause the computer device to utilize the glyph-based machine learning model to:
    generate the glyph image feature vector by:
        extracting glyph feature vectors from the unique glyphs within the glyph image; and
        concatenating the glyph feature vectors in order according to the ordering rule; and generate the target glyph image feature vectors by:
        extracting target glyph feature vectors from the unique target glyphs within the target glyph image; and
        concatenating the target glyph feature vectors in order according to the ordering rule.

4. The non-transitory computer readable medium of claim 1, further comprising instructions that, when executed by the at least one processor, cause the computer device to determine the matching font by:
    generating, utilizing the glyph-based machine learning model, one or more similarity scores indicating respective measures of visual similarity between the glyph image portraying the rearranged unique glyphs and the one or more target glyph images associated with the one or more target fonts; and
    determining that a similarity score for the matching font satisfies a similarity threshold.

5. The non-transitory computer readable medium of claim 1, further comprising instructions that, when executed by the at least one processor, cause the computer device to provide, for display within a user interface, a font menu depicting a list of matching fonts, wherein each matching font within the list has a similarity score that satisfies a similarity threshold in relation the unique glyphs within the user-selected sub-portion of digital text.

6. The non-transitory computer readable medium of claim 1, further comprising instructions that, when executed by the at least one processor, cause the computer device to identify the one or more target fonts by filtering, from the plurality of potential target fonts, potential target fonts that do not include corresponding unique target glyphs for one or more of the unique glyphs from the user-selected sub-portion of digital text.

7. The non-transitory computer readable medium of claim 1, further comprising instructions that, when executed by the at least one processor, cause the computer device to determine the matching font that corresponds to the unique glyphs by:
 utilizing the glyph-based machine learning model to determine similarity scores for the one or more target fonts, wherein each similarity score indicates a visual similarity between the unique glyphs and a respective target font; and
 ranking the one or more target fonts according to the similarity scores.

8. The non-transitory computer readable medium of claim 7, further comprising instructions that, when executed by the at least one processor, cause the computer device to provide, for display within a font menu of a user interface, a list of the one or more target fonts listed in order of the ranking, wherein each of the one or more target fonts within the list include unique target glyphs for each of the unique glyphs within the user-selected sub-portion of digital text.

9. The non-transitory computer readable medium of claim 1, further comprising instructions that, when executed by the at least one processor, cause the computer device to train the glyph-based machine learning model by:
 providing a training glyph to the glyph-based machine learning model;
 predicting, utilizing the glyph-based machine learning model, a predicted matching glyph; and
 comparing the predicted matching glyph with a ground-truth matching glyph.

10. A system comprising:
 at least one processor; and
 a non-transitory computer readable medium comprising instructions that, when executed by the at least one processor, cause the system to:
  identify unique glyphs from a set of glyphs within a user-selected sub-portion of digital text from a digital document, wherein the set of glyphs are arranged in a first arrangement;
  rearrange the unique glyphs into a second arrangement in accordance with an ordering rule defined by respective encoding values associated with the unique glyphs;
  generate a glyph image portraying the rearranged unique glyphs arranged according to the respective encoding values;
  determine, from a plurality of potential target fonts, target fonts that include unique target glyphs corresponding to each of the unique glyphs identified from the user-selected sub-portion of digital text; and
  utilize a glyph-based machine learning model to determine a matching font from the target fonts by:
   generating a glyph image feature vector from the glyph image portraying the rearranged unique glyphs;
   generating target glyph image feature vectors from target glyph images portraying the unique target glyphs of the target fonts arranged according to the ordering rule defined by the respective encoding values;
   comparing the glyph image feature vector with the target glyph image feature vectors; and
   selecting, based on the comparison, a matching font from the target fonts.

11. The system of claim 10, further comprising instructions that, when executed by the at least one processor, cause the system to:
 generate, utilizing the glyph-based machine learning model and based on comparing the glyph image feature vector with the target glyph image feature vectors, similarity scores indicating respective measures of visual similarity between the glyph image portraying the rearranged unique glyphs and the target glyph images associated with the target fonts;
 rank the target fonts according to the similarity scores; and
 select a highest-ranked target font as the matching font.

12. The system of claim 10, further comprising instructions that, when executed by the at least one processor, cause the system to provide, for display within a user interface, a font menu comprising a plurality of matching fonts, wherein each of the plurality of matching fonts includes unique target glyphs corresponding to each of the unique glyphs within the user-selected sub-portion of digital text and wherein each of the plurality of matching fonts satisfies a visual similarity threshold with respect to the unique glyphs within the user-selected sub-portion of digital text.

13. The system of claim 10, further comprising instructions that, when executed by the at least one processor, cause the system to generate the target glyph images by:
 identifying, from the plurality of potential target fonts, one or more target fonts that include unique target glyphs corresponding to each of the unique glyphs from the user-selected sub-portion of digital text; and
 arranging the unique target glyphs for each of the one or more target fonts according to the ordering rule defined by the respective encoding values.

14. The system of claim 10, further comprising instructions that, when executed by the at least one processor, cause the system to utilize the glyph-based machine learning model to generate the target glyph image feature vectors by:
 generating a first target glyph feature vector for a first unique target glyph of a target glyph image from the target glyph images;
 generating a second target glyph feature vector for a second unique target glyph of the target glyph image; and
 concatenating the first target glyph feature vector and the second target glyph feature vector according to the ordering rule defined by the respective encoding values.

15. The system of claim 10, further comprising instructions that, when executed by the at least one processor, cause the system to filter the plurality of potential target fonts by:
 comparing encoding values associated with the unique glyphs from the user-selected sub-portion of digital text and encoding values associated with the unique target glyphs from the plurality of potential target fonts; and removing potential target fonts that are missing unique target glyphs with encoding values corresponding to one or more of the unique glyphs from the user-selected sub-portion of digital text.

16. The system of claim 10, further comprising instructions that, when executed by the at least one processor, cause the system to receive the user-selected sub-portion of digital text by receiving, from a client device, user interaction selecting one or more glyphs from within the digital document.

17. A computer-implemented method comprising:
identifying unique glyphs from a set of glyphs within a user-selected sub-portion of digital text from a digital document, wherein the set of glyphs are arranged in a first arrangement;
rearranging the unique glyphs into a second arrangement in accordance with an ordering rule defined by respective encoding values associated with the unique glyphs;
generating a glyph image portraying the rearranged unique glyphs arranged according to the respective encoding values;
generating one or more target glyph images by:
identifying, from a plurality of potential target fonts one or more target fonts that include unique target glyphs corresponding to each of the unique glyphs from the user-selected sub-portion of digital text; and
arranging the unique target glyphs for each of the one or more target fonts according to the ordering rule defined by the respective encoding values; and determining a matching font that corresponds to the unique glyphs from the user-selected sub-portion of digital text by utilizing a glyph-based machine learning model to compare a glyph image feature vector corresponding to the rearranged unique glyphs in the glyph image and target glyph image feature vectors corresponding to the arranged unique target glyphs from the one or more target glyph images.

18. The method of claim 17, wherein:
the set of glyphs within the user-selected sub-portion of digital text comprise non-Latin characters; and
identifying the one or more target fonts comprises:
comparing encoding values associated with unique non-Latin glyphs from the user-selected sub-portion of digital text and encoding values associated with unique non-Latin target glyphs from the plurality of potential target fonts; and
filtering out potential target fonts that do not include unique non-Latin target glyphs with encoding values corresponding to one or more of the unique non-Latin glyphs from the user-selected sub-portion of digital text.

19. The method of claim 17, further comprising identifying the unique glyphs from among the set of glyphs within the user-selected sub-portion of digital text by filtering out repeat glyphs from the user-selected sub-portion of digital text.

20. The method of claim 17, wherein the glyph-based machine learning model comprises a neural network trained on glyph images of one or more glyphs.

* * * * *